US008977679B2

(12) United States Patent
Van Biljon et al.

(10) Patent No.: US 8,977,679 B2
(45) Date of Patent: Mar. 10, 2015

(54) LAUNCHING AN INSTANCE IN A VIRTUAL COMPUTING INFRASTRUCTURE

(75) Inventors: Willem Robert Van Biljon, Cape Town (ZA); Christopher Conway Pinkham, Los Gatos, CA (US); Russell Andrew Cloran, Cape Town (ZA); Michael Carl Gorven, Cape Town (ZA); Alexandre Hardy, Capetown (ZA); Brynmor K. B. Divey, Cape Town (ZA); Quinton Robin Hoole, Cape Town (ZA); Girish Kalele, Sunnyvale, CA (US)

(73) Assignee: Oracle International Corporation, Redwood Shores, CA (US)

( * ) Notice: Subject to any disclaimer, the term of this patent is extended or adjusted under 35 U.S.C. 154(b) by 169 days.

(21) Appl. No.: 13/299,287

(22) Filed: Nov. 17, 2011

(65) Prior Publication Data

US 2013/0060839 A1    Mar. 7, 2013

Related U.S. Application Data

(63) Continuation of application No. PCT/US2011/040590, filed on Jun. 15, 2011.

(60) Provisional application No. 61/355,078, filed on Jun. 15, 2010.

(51) Int. Cl.
*G06F 15/16* (2006.01)
*G06Q 30/04* (2012.01)
*G06Q 40/00* (2012.01)
*H04L 29/06* (2006.01)
(Continued)

(52) U.S. Cl.
CPC ............... *G06Q 30/04* (2013.01); *G06Q 40/00* (2013.01); *H04L 29/06* (2013.01); *H04L 41/0213* (2013.01); *G06Q 40/02* (2013.01); *G06Q 40/10* (2013.01)
USPC ........................... 709/203; 709/228; 714/4.11

(58) Field of Classification Search
CPC . H04N 21/4437; G06F 9/4856; G06F 9/5077; G06F 9/45533; G06F 9/455; G06F 8/65; G06F 9/5055
USPC ................................................... 709/203, 228
See application file for complete search history.

(56) References Cited

U.S. PATENT DOCUMENTS 4,086,628 A    4/1978  Woodrum
5,239,648 A    8/1993  Nukui
(Continued)

OTHER PUBLICATIONS

PCT International Search Report of PCT/US11/40590; dated Jan. 5, 2012.
(Continued)

*Primary Examiner* — Jonathan C Teixeira Moffat
*Assistant Examiner* — Eyob Hagos
(74) *Attorney, Agent, or Firm* — Kilpatrick Townsend and Stockton LLP

(57) ABSTRACT

Launching an instance in cloud computing environment having a plurality of computing nodes is described. At a user's home cloud system, a request is received from the user to launch an instance of an object. At the home cloud system, a designated remote cloud system is determined from a federated plurality of remote cloud systems based on the request. The request is translated into a format suitable for the designated remote cloud system. The translated request is communicated to the designated remote cloud system. The instance of the object is launched at the designated remote cloud.

14 Claims, 22 Drawing Sheets

(51) Int. Cl.
   *H04L 12/24* (2006.01)
   *G06Q 40/02* (2012.01)

(56) References Cited

U.S. PATENT DOCUMENTS

| | | | |
|---|---|---|---|
| 5,832,505 A | 11/1998 | Kasso et al. | |
| 6,473,800 B1 | 10/2002 | Jerger et al. | |
| 6,772,350 B1 | 8/2004 | Belani et al. | |
| 6,944,777 B1 | 9/2005 | Belani et al. | |
| 7,200,865 B1 | 4/2007 | Roscoe et al. | |
| 7,225,210 B2 | 5/2007 | Guthrie | |
| 7,475,419 B1 | 1/2009 | Basu et al. | |
| 7,602,756 B2 | 10/2009 | Gu et al. | |
| 7,631,306 B1 | 12/2009 | Puig et al. | |
| 7,890,626 B1 | 2/2011 | Gadir | |
| 7,921,452 B2 | 4/2011 | Ridlon et al. | |
| 7,958,246 B2 | 6/2011 | Barber | |
| 8,037,108 B1 | 10/2011 | Chang | |
| 8,086,177 B2 | 12/2011 | Thrift et al. | |
| 8,108,377 B2 | 1/2012 | Jiang et al. | |
| 8,201,175 B2 | 6/2012 | Zhu | |
| 8,341,141 B2 | 12/2012 | Krislov | |
| 8,347,263 B1 | 1/2013 | Offer | |
| 8,472,438 B2 | 6/2013 | Kini et al. | |
| 8,577,937 B1 | 11/2013 | Offer | |
| 8,584,215 B2 | 11/2013 | Narasimha et al. | |
| 2002/0052941 A1 | 5/2002 | Patterson | |
| 2002/0097747 A1 | 7/2002 | Kirkby et al. | |
| 2003/0018927 A1 | 1/2003 | Gadir et al. | |
| 2003/0037284 A1 | 2/2003 | Srinivasan et al. | |
| 2003/0105810 A1* | 6/2003 | McCrory et al. | 709/203 |
| 2004/0024892 A1 | 2/2004 | Creswell et al. | |
| 2004/0184070 A1 | 9/2004 | Kiraly et al. | |
| 2004/0250120 A1 | 12/2004 | Ng | |
| 2005/0055306 A1 | 3/2005 | Miller et al. | |
| 2005/0065855 A1 | 3/2005 | Geller | |
| 2005/0187937 A1 | 8/2005 | Kawabe et al. | |
| 2005/0193218 A1 | 9/2005 | Susser et al. | |
| 2006/0112176 A1 | 5/2006 | Liu et al. | |
| 2006/0209868 A1 | 9/2006 | Callaghan | |
| 2006/0212545 A1 | 9/2006 | Nichols et al. | |
| 2006/0259947 A1 | 11/2006 | Aarnos et al. | |
| 2007/0072591 A1 | 3/2007 | McGary et al. | |
| 2007/0162456 A1 | 7/2007 | Agassi et al. | |
| 2008/0052203 A1 | 2/2008 | Beyer et al. | |
| 2008/0195760 A1 | 8/2008 | Nudler | |
| 2008/0228734 A1 | 9/2008 | Kang | |
| 2008/0316980 A1 | 12/2008 | Ahlen et al. | |
| 2009/0024522 A1 | 1/2009 | Reunert et al. | |
| 2009/0182622 A1 | 7/2009 | Agarwal et al. | |
| 2009/0235342 A1 | 9/2009 | Manion et al. | |
| 2009/0240728 A1* | 9/2009 | Shukla et al. | 707/103 R |
| 2009/0276771 A1 | 11/2009 | Nickolov et al. | |
| 2009/0300210 A1 | 12/2009 | Ferris | |
| 2009/0300350 A1 | 12/2009 | Gai et al. | |
| 2009/0319529 A1 | 12/2009 | Bartlett et al. | |
| 2009/0327471 A1 | 12/2009 | Astete et al. | |
| 2010/0036736 A1 | 2/2010 | McGee et al. | |
| 2010/0042720 A1* | 2/2010 | Stienhans et al. | 709/226 |
| 2010/0061391 A1 | 3/2010 | Sindhu et al. | |
| 2010/0070501 A1 | 3/2010 | Walsh et al. | |
| 2010/0071035 A1 | 3/2010 | Budko et al. | |
| 2010/0083004 A1 | 4/2010 | Kirshenbaum | |
| 2010/0114714 A1 | 5/2010 | Vitek | |
| 2010/0169477 A1 | 7/2010 | Stienhans et al. | |
| 2010/0180014 A1 | 7/2010 | Kannan et al. | |
| 2010/0185455 A1 | 7/2010 | Miller | |
| 2010/0194963 A1 | 8/2010 | Terashima | |
| 2010/0197267 A1 | 8/2010 | Raleigh | |
| 2010/0223385 A1 | 9/2010 | Gulley et al. | |
| 2010/0250748 A1 | 9/2010 | Sivasubramanian et al. | |
| 2010/0250956 A1 | 9/2010 | Reed et al. | |
| 2010/0251242 A1 | 9/2010 | Sivasubramanian et al. | |
| 2010/0269109 A1* | 10/2010 | Cartales | 718/1 |
| 2010/0318645 A1 | 12/2010 | Hoole et al. | |
| 2010/0332629 A1 | 12/2010 | Cotugno et al. | |
| 2011/0016214 A1* | 1/2011 | Jackson | 709/226 |
| 2011/0022652 A1 | 1/2011 | Lai et al. | |
| 2011/0022812 A1 | 1/2011 | van der Linden et al. | |
| 2011/0055034 A1 | 3/2011 | Ferris et al. | |
| 2011/0055378 A1 | 3/2011 | Ferris et al. | |
| 2011/0096174 A1 | 4/2011 | King et al. | |
| 2011/0106875 A1 | 5/2011 | Koenig | |
| 2011/0126047 A1 | 5/2011 | Anderson et al. | |
| 2011/0126168 A1* | 5/2011 | Ilyayev | 717/103 |
| 2011/0191610 A1 | 8/2011 | Agarwal et al. | |
| 2011/0209064 A1 | 8/2011 | Jorgensen et al. | |
| 2011/0213687 A1 | 9/2011 | Ferris et al. | |
| 2011/0214124 A1 | 9/2011 | Ferris et al. | |
| 2011/0225299 A1* | 9/2011 | Nathuji et al. | 709/226 |
| 2011/0243553 A1 | 10/2011 | Russell | |
| 2011/0246253 A1 | 10/2011 | Yu et al. | |
| 2011/0265147 A1 | 10/2011 | Liu | |
| 2011/0270721 A1 | 11/2011 | Kusterer | |
| 2011/0270968 A1 | 11/2011 | Salsburg et al. | |
| 2011/0295999 A1 | 12/2011 | Ferris et al. | |
| 2011/0296019 A1 | 12/2011 | Ferris et al. | |
| 2011/0307899 A1* | 12/2011 | Lee et al. | 718/104 |
| 2012/0079276 A1 | 3/2012 | Evans et al. | |
| 2012/0096158 A1* | 4/2012 | Astete et al. | 709/225 |
| 2012/0110055 A1 | 5/2012 | Van Biljon et al. | |
| 2012/0110056 A1 | 5/2012 | Van Biljon et al. | |
| 2012/0110180 A1 | 5/2012 | Van Biljon et al. | |
| 2012/0110188 A1 | 5/2012 | Van Biljon et al. | |
| 2012/0110636 A1 | 5/2012 | Van Biljon et al. | |
| 2012/0110650 A1 | 5/2012 | Van Biljon et al. | |
| 2012/0110651 A1 | 5/2012 | Van Biljon et al. | |
| 2012/0116937 A1 | 5/2012 | Van Biljon et al. | |
| 2012/0117229 A1 | 5/2012 | Van Biljon et al. | |
| 2012/0246646 A1 | 9/2012 | Bakman | |
| 2012/0259815 A1 | 10/2012 | Olson | |
| 2012/0310880 A1 | 12/2012 | Giampaolo et al. | |
| 2013/0030853 A1 | 1/2013 | Agarwal et al. | |

OTHER PUBLICATIONS

U.S. Appl. No. 13/299,004, Final Office Action mailed on Oct. 2, 2013, 42 pages.

U.S. Appl. No. 13/299,066, Final Office Action mailed on Oct. 22, 2013, 18 pages.

U.S. Appl. No. 13/299,157 Final Office Action mailed on Dec. 5, 2013, 11 pages.

U.S. Appl. No. 13/299,262, Final Office Action mailed on Oct. 30, 2013, 8 pages.

U.S. Appl. No. 13/299,335, Non-Final Office Action mailed Nov. 22, 2013, 33 pages.

U.S. Appl. No. 13/299,066, Non-Final Office Action mailed Mar. 12, 2014, 16 pages.

U.S. Appl. No. 13/299,004, Notice of Allowance mailed Mar. 24, 2014, 22 pages.

U.S. Appl. No. 13/299,335, Notice of Allowance mailed May 1, 2014, 7 pages.

Canetti et al. "Practical delegation of computation using multiple servers," CCS '11 Proceedings of the 18th ACM conference on Computer and communications security, pp. 445-454(Oct. 2011).

U.S. Appl. No. 13/299,206, Non-Final Office Action mailed on May 22, 2014, 10 pages.

U.S. Appl. No. 13/299,301, Non-Final Office Action mailed on Jun. 12, 2014, 18 pages.

U.S. Appl. No. 13/299,319, Non-Final Office Action mailed on Jun. 6, 2014, 13 pages.

U.S. Appl. No. 13/299,004, Non Final Office Action mailed on Apr. 15, 2013, 58 pages.

U.S. Appl. No. 13/299,066, Non Final Office Action mailed on Apr. 12, 2013, 26 pages.

U.S. Appl. No. 13/299,157, Non-Final Office Action mailed on May 24, 2013, 14 pages.

U.S. Appl. No. 13/299,262, Non Final Office Action mailed on May 2, 2013, 12 pages.

U.S. Appl. No. 13/299,339, Final Office Action mailed on Aug. 7, 2013, 16 pages.

(56) References Cited

OTHER PUBLICATIONS

U.S. Appl. No. 13/299,339, Non Final Office Action mailed on Nov. 16, 2012, 12 pages.
Karjoth, Access Control with IBM Tivoli Access, IBM Research, Zurich Research Laboratory, vol. 6, No. 2, May 2003, pp. 232-257.
International Preliminary Report on Patentability for application PCT/US2013/025211 (Aug. 28, 2014).
U.S. Appl. No. 13/299,066, Final Office Action mailed Jul. 18, 2014, 19 pages.
U.S. Appl. No. 13/299,335, Notice of Allowance mailed Jul. 18, 2014, 7 pages.
U.S. Appl. No. 13/299,339, Non-Final Office Action mailed on Sep. 3, 2014, 8 pages.
U.S. Appl. No. 13/299,335, Notice of Allowance mailed Sep. 15, 2014, 10 pages.
U.S. Appl. No. 13/299,262, Non-Final Office Action mailed on Nov. 17, 2014, 14 pages.

\* cited by examiner

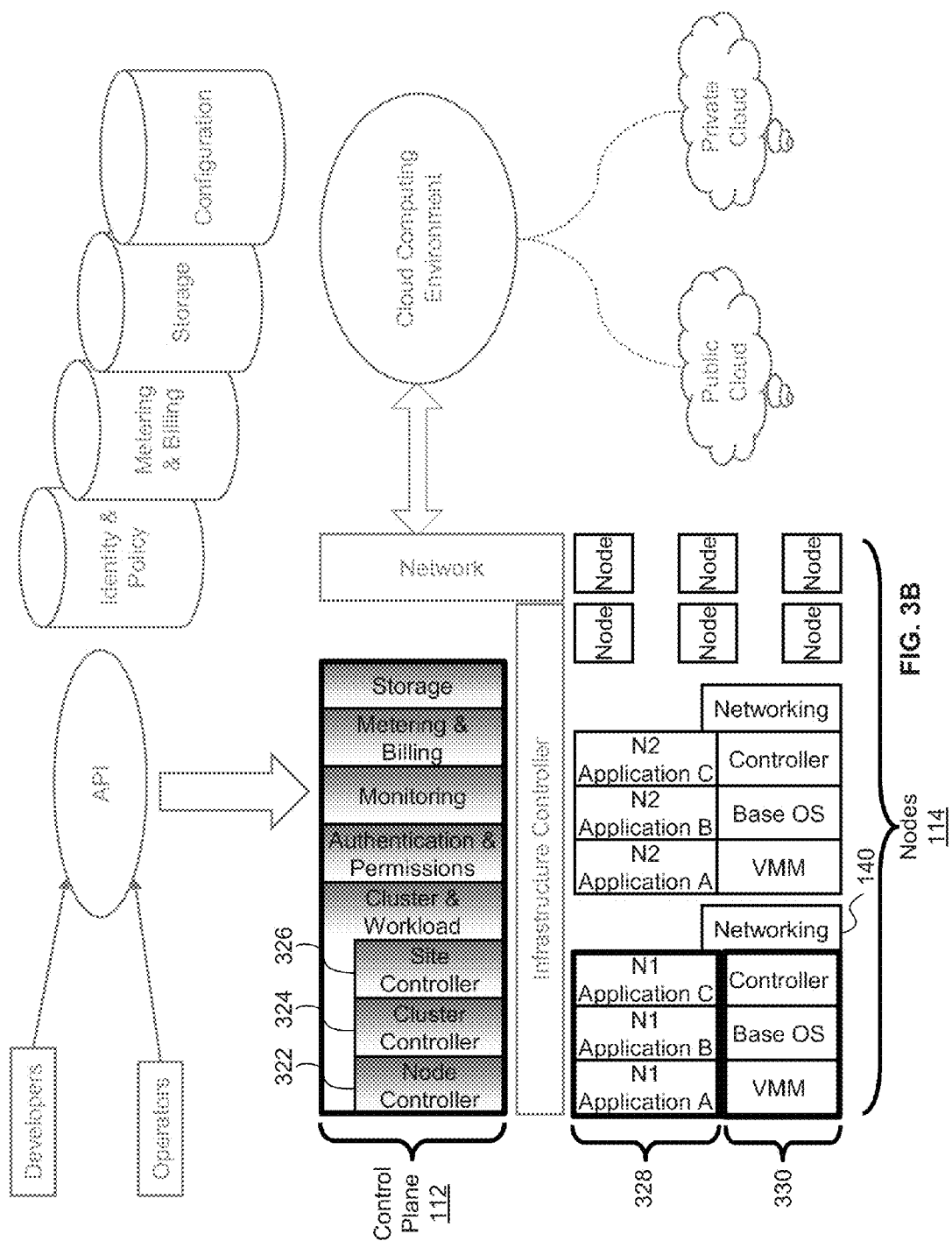

| PERMISSION 902 | |
|---|---|
| Key 904 | Value 906 |
| authorizer | group:/acme/admin |
| subject | group:/acme/us/dev |
| object | launchplan:/acme/dev |
| action | launchplan.add |
| ••• | ••• |
| | |
| | |
| | |

FIG. 9A

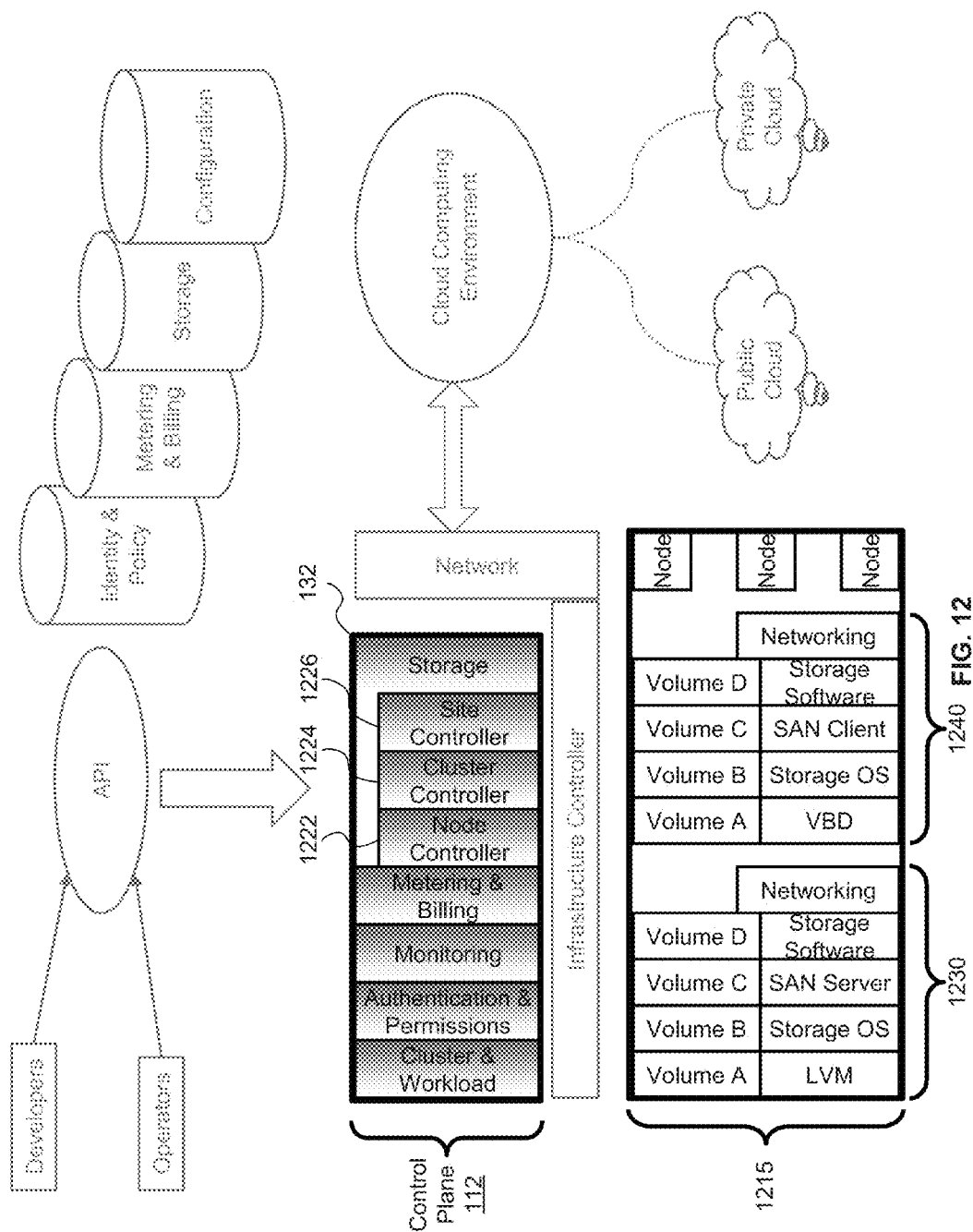

US 8,977,679 B2

LAUNCHING AN INSTANCE IN A VIRTUAL COMPUTING INFRASTRUCTURE

CROSS-REFERENCE TO RELATED APPLICATIONS

This patent application is a continuation of International application no. PCT/US11/40590 filed on Jun. 15, 2011, entitled "Virtual Computing Infrastructure", which claims priority under 35 U.S.C. §119(e) to U.S. provisional application No. 61/355,078 filed on Jun. 15, 2010, entitled "Virtual Computing Infrastructure", which is hereby incorporated by reference in its entirety. This application is additionally related to U.S. application Ser. No. 13/299,004 filed on Nov. 17, 2011 entitled "Organizing Permissions Associated with a Cloud Customer in a Virtual Computing Infrastructure"; U.S. application Ser. No. 13/299,066 filed on Nov. 17, 2011 entitled "Granting Access to a Cloud Computing Environment Using Names in a Virtual Computing Infrastructure"; U.S. application Ser. No. 13/299,157 filed on Nov. 17, 2011 entitled "Defining an Authorizer in a Virtual Computing Infrastructure"; U.S. application Ser. No. 13/299,262 filed on Nov. 17, 2011 entitled "Objects in a Virtual Computing Infrastructure"; U.S. application Ser. No. 13/299,301 filed on Nov. 17, 2011 entitled "Organizing Data in a Virtual Computing Infrastructure"; U.S. application Ser. No. 13/299,319 filed on Nov. 17, 2011 entitled "Virtualization Layer in a Virtual Computing Infrastructure"; U.S. application Ser. No. 13/299,206 filed on Nov. 17, 2011 entitled "Building a Cloud Computing Environment Using a Seed Device in a Virtual Computing Infrastructure"; U.S. application Ser. No. 13/299,335 filed on Nov. 17, 2011 entitled "Networking in a Virtual Computing Infrastructure"; and U.S. application Ser. No. 13/299,339 filed on Nov. 17, 2011 entitled "Billing Usage in a Virtual Computing Infrastructure".

TECHNICAL FIELD

This patent application relates to computers, digital computing or data processing systems and methods, including cloud computing and dynamic workload allocation in cloud computing environments.

BACKGROUND

Cloud computing is an Internet-based computing concept whereby shared resources, software and information are provided to computers and other devices on-demand, like a public utility.

The term "cloud" is used as a metaphor for a network, based on the cloud drawing used to represent the telephone network, and later to depict the Internet in computer network diagrams as an abstraction of the underlying infrastructure it represents. Typical cloud computing providers deliver common business applications online which are accessed from another web service or software, like a web browser, while the software and data are stored on servers.

In general, cloud computing customers do not own the physical infrastructure. Instead customers can avoid capital expenditure by renting usage from a third-party provider. They consume resources as a service and pay only for resources that they use. Many cloud-computing offerings employ the utility computing model, which is analogous to how traditional utility services (such as electricity) are consumed, whereas others bill on a subscription basis. Sharing "perishable and intangible" computing power among multiple tenants offer the promise of improving utilization rates, as servers are not unnecessarily left idle (which can reduce costs significantly while increasing the speed of application development).

SUMMARY

This disclosure relates to a method of organizing permissions to authorize a subject to perform an action on an object in a cloud computing environment having a plurality of computing nodes. The method comprises creating a plurality of permissions associated with a cloud customer, associating a first set of permissions from the plurality of permissions with one or more objects, wherein each of the first set of permissions describes an action performed on an object, and associating a second set of permissions from the plurality of permissions with one or more users. Each of the second set of permissions describes an action to be performed by one or more users.

In the method, the object can be a machine image from which data is accessed. The object can also be executed code. The object can be a data store.

This disclosure also relates to a method of authorizing a subject to perform an action on an object in a cloud computing environment having a plurality of computing nodes. The method comprises receiving a request by a user for performing an action in the cloud computing system, determining, from a plurality of permissions, whether an object permission exists for the object upon which the action is to be performed, determining, from the plurality of permissions, whether a user permission exists for user to act upon the object, and authorizing the request upon determining the object permission and user permission for the action on the object.

This disclosure further relates to a method of allowing an authorizing entity to grant permission to a subject to perform an action on an object in a cloud computing environment having a plurality of computing nodes. The method comprises defining an authorizer as the entity having granting authority to delegate a predetermined permission, defining a subject as a group to whom the permission is being delegated, defining an object upon which an action is authorized within the cloud computing environment, defining the action being authorized in the cloud computing environment, and allowing members of the subject group to perform the permitted action on the object.

In the method the object can be a machine image executed as a virtual machine. The object can also be executed as code by a computing node. Further, the object can be a data store accessed by a computing node.

In addition, this disclosure relates to a method of allowing at least one user to perform an action in a cloud computing environment having a plurality of computing nodes. The method comprises receiving a request to permit the at least one user to perform an action on an object in the cloud computing system, locating a set of user permissions and a set of object permissions compatible with the received request, determining at least one user permission and at least one object permission from the set of user and object permissions based on if the object is compatible with the requested object and the action is compatible with the requested action, determining if the user permission and the object permission are associated with a policy assertion, wherein the policy assertion is associated with a customer account that controls access to the cloud computing environment, and authorizing the request if the user permission and the object permission are associated with the policy assertion.

In the method the cloud computing environment can be a home cloud. The request can be received at the home cloud from a cloud remote from the home cloud, and the policy assertion can reside locally in the home cloud.

Also in the method, the cloud computing environment can be a cloud remote from a home cloud, and the request can be received at the remote cloud from the home cloud and the policy assertion can reside in the remote cloud.

Further in the method, the cloud computing environment can be a cloud remote from a home cloud. The request can be received at the remote cloud from the home cloud and the policy assertion resides in remote cloud.

Moreover, this disclosure relates to a method of granting access to resources in a cloud computing environment having a plurality of computing nodes. The method comprises defining a group of users within the cloud computing environment, assigning a first name to the group, defining at least one subgroup of users from within the group, and assigning a second name to the at least one subgroup, the second name following a hierarchical naming structure of the form/group/subgroup.

The method can further comprises defining at least a sub-subgroup of users from within the subgroup and assigning a third name to the sub-subgroup, the third name following a hierarchical naming structure of the form/group/subgroup/sub-subgroup.

Further, the method comprises defining a plurality of subgroups of users derived from the group of users, each subgroup in the plurality of subgroups being derived from another subgroup of users in the plurality of subgroups, the plurality of subgroups being organized in a hierarchy, and assigning a plurality of names to each of the plurality of subgroups, each of the subgroups named in a hierarchical order.

Further, this disclosure relates to a method of granting access to resources in a cloud computing environment having a plurality of computing nodes. The method comprises defining a first group of users and a second group of users within the cloud computing environment, associating the first group of users with a name in the form x/first name, associating the second group of users with a name in the form y/first name, granting access to at least one cloud resource from a first set of resources based on the first name in the form x/first name; and granting access to at least one cloud resource from a second set of resources based on the first name in the form y/first name.

The method further comprises defining at least one subgroup from within the first group and at least one subgroup from within the second group, associating the subgroup from within the first group with a name in the form x/first name/second name, associating the subgroup from within the second group with a name in the form y/first name/second name, granting access to at least one cloud resource from a first set of resources based on the name in the form x/first name/second name, and granting access to at least one cloud resource from a second set of resources based on the name in the form y/first name/second name.

This disclosure extends to a method of granting access to resources in a cloud computing environment having a plurality of computing nodes. The method comprises defining a group of users within the cloud computing environment, associating with group of users a first set of permissions or privileges, and defining at least one subgroup of users from within the group. In addition, the method includes associating with the at least one subgroup of users a second set of permissions or privileges in addition to the first set of permissions or privileges inherited from the group, granting access to at least one cloud resource from a first set of resources based on the group of users, and granting access to at least one cloud resource from the first set of resources and a second set of resources to the at least one subgroup of users.

The method further comprises defining at least a sub-subgroup of users from within the subgroup, associating with the sub-sub group a third set of permissions or privileges in addition to the first and second set of permissions or privileges, and granting access to at least one cloud resource from the first set of resources, the second set of resources and a third set of resources to the sub-sub group.

Further, the method comprises partitioning the plurality of permissions or privileges into a plurality of subsets of permissions or privileges, the plurality of subsets of permissions or privileges being organized in a hierarchy wherein each iteration of partitioning the plurality of permissions or privileges is derived from a prior subset. In addition, the method includes associating each subset of permissions or privileges from the plurality of subsets to a group of users, wherein the groups of users are partitioned and organized according to the hierarchy, wherein each partitioned group of users, in addition to its own subset of permissions or privileges, inherits the subset of permissions or privileges from the prior group of users.

This disclosure also extends to a method of allowing an authorizing entity to grant permission to a subject to perform an action on an object in a cloud computing environment having a plurality of computing nodes. The method comprises defining an authorizer as the entity having granting authority to delegate a predetermined permission, defining a subject as a group to whom the permission is being delegated, defining an object upon which an action is authorized within the cloud computing environment, defining the action being authorized in the cloud computing environment, and allowing members of the subject group to perform the permitted action on the object.

In the method, the object can be a machine image from which data is accessed. The object can also be executed code. Further, the object can be a data store.

This disclosure further extends to a method of organizing permissions to authorize a subject to perform an action on an object in a cloud computing environment having a plurality of computing nodes. The method comprises creating a plurality of permissions associated with a cloud customer, associating, a first set of permissions from the plurality of permissions with one or more objects, wherein each of the first set of permissions describes an action performed on an object, and associating a second set of permissions from the plurality of permissions with one or more users, wherein each of the second set of permissions describes an action permitted to be performed by one or more users.

In the method, the object can be a machine image from which data is accessed. The object can also be executed code. Further, the object can be a data store.

In addition, this disclosure extends to a method of authorizing a subject to perform an action on an object in a cloud computing environment having a plurality of computing nodes. The method comprises receiving a request by a user for performing an action in the cloud computing system, determining, from a plurality of permissions, whether an object permission exists for the object upon which the action is to be performed, determining, from the plurality of permissions, whether a user permission exists for user to act upon the object, and authorizing the request upon determining the object permission and user permission for the action on the object.

The method further comprises authorizing the request includes associating a first key-value to the requested action by the user and associating a second key-value to the object permission.

Moreover, this disclosure extends to a method of allowing at least one user to perform an action in a cloud computing environment having a plurality of computing nodes. The method comprises receiving a request to permit the at least one user to perform an action on an object in the cloud computing system and locating a set of user permissions and a set of object permissions compatible with the received request. In addition, the method includes determining at least one user permission and at least one object permission from the set of user and object permissions based on if the object is compatible with the requested object and the action is compatible with the requested action, determining if the user permission and the object permission are associated with a policy assertion, wherein the policy assertion is associated with a customer account that controls access to the cloud computing environment, and authorizing the request if the user permission and the object permission are associated with the policy assertion.

In the method, the cloud computing environment can be the home cloud. The policy assertion can reside locally in the home cloud, and the request can be received from a cloud remote from the home cloud.

Further, this disclosure extends to a method of authorizing at least one user to perform an action in a cloud computing environment having a plurality of computing nodes. The method comprises receiving a request from a user to perform an action on an object in the cloud computing system, determining, whether a user permission exists for user to perform the action on the object, and forwarding the request to a remote service. In addition, the method includes receiving, from the remote service, a determination of whether an object permission exists for the object upon which the action is to be performed, and authorizing the request upon determining the user permission for the action on the object and receiving the object permission from the remove service.

The method further comprises requesting performance of an action on an object in the cloud computing system in which the request includes a request to perform an action at a remote cloud location. In the method, the remote cloud location can be at a private cloud site. Further, the remote cloud location can be at a public cloud site.

This disclosure relates to a method of authenticating a user in a cloud computing environment having a plurality of computing nodes. The method comprises receiving login information from a user requesting access to the cloud computing environment, consulting an active directory to determine one or more permissions associated with the user, based on the user login information, and authenticating the user to grant access to the cloud computing system based on the result from consulting the active directory.

The method further comprises consulting an active directory includes consulting an external identity provider. In the method, login information is received over an SSL or TLS channel. Further in the method, the login information can include a set of credentials known to the user.

This disclosure also relates to a method of performing an action on an object in a cloud computing environment having a plurality of computing nodes. The method comprises determining a policy path from at least one permission within a policy of a customer and determining a first delegation path from within the determined policy path, the first delegation path directed to at least one object permission for the object upon which the action is to be performed. In addition, the method includes assigning an authorized user from a second delegation path from within the determined policy path, the second delegation path directed to at least one user permission for the action to be performed.

The method can further include determining a policy path includes the determination that the authorized user is the same as or a descendant of a subject specified in the at least one user permission, the object on which the action to be performed is the same as or a descendant of the object specified in the at least one object permission, and the action in either the user or object permission is unspecified or the same as the action requested.

This disclosure further relates to a method of granting permission to access a cloud computing environment having a plurality of computing nodes. The method comprises determining a policy to which a plurality of permissions is associated, determining a first permission associated with the policy, and determining a second permission associated with the policy, wherein an authorizer of the second permission is compatible with at least one from a group consisting of a subject, action, or object associated with the first permission.

In the method, the authorizer of the second permission can share a same value as the subject associated with the first permission. The authorizer can be a descendant of a subject associated with the first permission, in a naming hierarchy.

In addition, this disclosure relates to a method of launching an instance in a multi-cloud computing environment having a plurality of computing nodes. The method comprises receiving, at a user's home cloud system, a request from the user to launch an instance of an object, determining, at the home cloud system, a designated remote cloud system from a federated plurality of remote cloud systems based on the request, translating the request into a format suitable for the designated remote cloud system, communicating the translated request to the designated remote cloud system; and launching the instance of the object at the designated remote cloud.

In the method, the federated plurality of remote cloud systems can include at least one public cloud system. The designated remote cloud system can be a public cloud system. The method relates to the launching the instance at the designated remote cloud is executed via instructions from a launch plan. Further in the method, the launch plan includes instructions to launch a virtual machine instance. The launch plan can include instructions to launch an object by a computing node. The object can be a machine image from which data can be accessed. The object can also be executed code. Further, the object can be a data store.

Moreover, this disclosure relates to a multi-cloud computing system comprises a plurality of computing nodes. The system configures to receive, at a user's home cloud system, a request from the user to launch an instance of an object, determine, at the home cloud system, a designated remote cloud system from a federated plurality of remote cloud systems based on the request; translate the request into a format suitable for the designated remote cloud system; communicate the translated request to the designated remote cloud system; and launch the instance of the object at the designated remote cloud.

In the system, a virtualization layer configured to create a virtual computing environment on each of the plurality of computing nodes.

Further, this disclosure relates to a method of communicating in a multi-cloud computing environment having a plurality of computing nodes. The method comprises transmitting a request from a user to perform an action on an object via a proxy service, wherein the action is to be executed in a remote cloud. In addition, the method includes determining, at the proxy service, the remote cloud system from a plurality of remote cloud systems based on the request, translating the request to be suitable for the designated remote cloud, determining whether a permission exists for the object upon which the action is to be performed, determining whether a permission exists for a user to act upon the object; and authorizing the requested action designated for the remote cloud upon determining adequate object permission and user permission for the action on the object.

In the method, the plurality of the remote cloud systems can include at least one public cloud system. The designated remote cloud system can be a public cloud system. The request can include a request to launch a virtual machine instance from a home cloud system to one of a plurality of remote cloud systems. In addition, the proxy service can be on the home cloud or the proxy service is external to the home cloud.

This disclosure extends to a multi-cloud computing system comprises a plurality of computing nodes. The system configures to transmit a request from a user to perform an action on an object via a proxy service, wherein the action is to be executed in a remote cloud, determine, at the proxy service, the remote cloud system from a plurality of remote cloud systems based on the request, translate the request to be suitable for the designated remote cloud, determine whether a permission exists for the object upon which the action is to be performed, determine whether a permission exists for a user to act upon the object; and authorize the requested action designated for the remote cloud upon determining adequate object permission and user permission for the action on the object.

In the system, a virtualization layer configured to create a virtual computing environment on each of the plurality of computing nodes.

This disclosure also extends to a method of organizing data in a cloud computing environment having a plurality of computing nodes. The method comprises receiving an authorization to service a request, the request being from a user for launching an instance, in response to receiving the authorization, determining, based on the request, an image list, and the image list including information corresponding to a plurality of machine images. In addition, the method includes identifying at least one machine image from the image list associated with a functional requirement of the request; launching the instance at the at least one computing node; and updating the at least one machine image after the instance has been launched.

In the method, launching the instance can include launching an application and data associated with the request by the user. Also in the method, the information can include a version number and at least one attribute that are a reference to at least one machine image. The request can also include a launch plan defined by the user.

In the method, the image can be an object upon which an action is to be performed. Also in the method, the object can be a software application from which an instance is launched. The object can also be data accessed when an instance is launched. Further, in the method the plurality of machine images includes a plurality of versions of the same image. The method further comprises providing a default image version when the launch plan does not specify a version of an image.

This disclosure further extends to a method of distributing workload in a cloud computing environment having a plurality of computing nodes. The method comprising receiving an authorization to service a request, the request being from a user for launching an instance, in response to receiving the authorization, requesting resource availability information from the plurality of computing nodes for processing the request, wherein the plurality of computing nodes are organized into a plurality of clusters. In addition, the method includes computing a score for each of the plurality of clusters that responded to the requested resource availability information, assigning the request to be serviced by a cluster from the plurality of clusters based on the computed score for each of the plurality of clusters that responded, and launching the instance from the assigned cluster.

The method can further include assigning the request based on the computed score includes selecting the cluster with the highest score. The method can further include monitoring the current status of each of nodes in each of the plurality of clusters. In the method, the resource availability information may include the number of CPUs and amount of RAM needed. In addition, the method can relate to the resource availability information being provided by a cluster controller at each cluster. Further, in the method the score computed for each of the plurality of clusters that responded to the requested resource availability information is computed by a site controller.

In addition, this disclosure extends to a cloud computing system which comprises a plurality of computing nodes organized into a plurality of clusters, each of the plurality of clusters including a cluster controller. In addition, the system includes a virtualization layer configured to create a virtual computing environment on each of the plurality of computing nodes, an infrastructure controller configured to operate on each of the plurality of computing nodes and to communicate with the virtualization layer, the infrastructure controller being further configured to receive an authorization to service a launch plan from a user, and the launch plan including at least one instance to launch. Further, the system includes a site controller configured to receive instructions from the infrastructure controller in response to the authorization, the site controller being further configured to request bandwidth information from each of the cluster controllers of the plurality of clusters, compute a score for each of the plurality of clusters that responded to the requested bandwidth information, and assign the launch plan to a cluster from the plurality of clusters based on the computed scores.

Moreover, this disclosure extends to a method of organizing data in a cloud computing environment having a plurality of computing nodes. The method comprises receiving a launch plan from a user for launching at least one instance. In response to receiving the launch plan, determining whether the user submitting the launch plan has permission to access at least one an image list specified in the launch plan, the at least one image list including information corresponding to a plurality of machine images. In addition, the method includes determining whether the user has permission to launch at least one new instance of an image in that launch plan and rejecting the launch plan if the user does not have permission.

The method further comprises identifying a set of resource attributes included in the launch plan, determining whether one or more of the plurality of computing nodes have capacity to meet the set of resource attributes; and rejecting the launch plan if the set or resource attributes of the launch plan cannot be met by the one or more plurality of computing nodes.

In addition, the method further comprises generating a candidate list of computing nodes based on determining whether one or more of the plurality of computing nodes have capacity to meet the set of resource attributes.

Further, this disclosure extends to a method of determining a computing node to run an instance in a cloud computing environment having a plurality of nodes. The method comprises receiving an authorization to service a launch plan, the launch plan being from a user and including at least one image list to launch. In response to receiving the authorization, identifying at least one tag or attribute constraining the nodes on which the instance may be launched. In addition, the method includes searching the plurality of computing nodes based on the at least one tag to identify at least one computing node having one or more computing resources that matches at least one attribute required by the instance launch, assigning the launch of the at least one instance to the at least one computing node based on the match; and launching the instance on the assigned computing node.

In the method, at least one attribute can be from a group consisting of RAM, number of CPUs, virtual block device type, and network interface. In the method, the match can be based on a plurality of attributes of the at least one instance and the match can be conducted based on an arbitrary number of the plurality of instance attributes. The launch plan can include a number of instances to launch, each instance to launch including at least one from a group consisting of image list specification, memory size, number of VNICs, one or more block devices, and one or more attributes.

This disclosure relates to a cloud computing system comprises a plurality of computing nodes and a virtualization layer configured to create a virtual computing environment on each of the plurality of computing nodes. The system configures to receive an authorization to service a launch plan, the launch plan being from a user and including at least one instance to launch. In response to the authorization, identify at least one tag to determine at least one attribute of the at least one instance. In addition, the system includes search the plurality of computing nodes based on the at least one tag to identify at least one computing node having one or more computing resources that matches at least one attribute of the instance, assign the launch of the at least one instance to the at least one computing node based on the match, and launch the instance from the assigned computing node.

This disclosure also relates to a method of assigning a computing node to run an instance in a cloud computing environment having a plurality of computing nodes. The method comprises storing a representation of a launch plan, comparing an actual state of the instances running in the system to the ideal state as specified in the launch plan, and applying changes to the actual state of the system to make it consistent with the ideal state as specified in the launch plan.

This disclosure further relates to a method of building a cloud computing environment having a plurality of computing nodes. The method comprises connecting a seed device to a network, initiating, from the seed device, a launching of a cloud computing management configuration, the seed device includes a repository of software, and installing, from the seed device, software on one of the plurality of computing nodes to run a cloud computing management system. In addition, the method includes loading the software from the one of the plurality of computing nodes onto each of the plurality of nodes, selecting a computing node, from the plurality of computing nodes, to designate as a master node, and controlling operations of the cloud computing management system from the master node.

The method can further include selecting a subset of computing nodes from the plurality of computing nodes to designate as sub-master nodes configured to receive instructions from the master node. In the method, the sub-master nodes may receive instructions from the master node for executing a subset of software applications on one or more of the plurality of computing nodes. In the event of the master node failing, an election can be held amongst the sub-master nodes to designate another master node.

In addition, the method relates to initiating, from the seed device, the launching of the a cloud computing management configuration by initiating an automated build out of the cloud computing management system onto the plurality of computing nodes. The plurality of computing nodes can include at least one from a group consisting of servers, desktop computers, and storage devices. Further, the method may extend to the cloud computing management system that includes an automated virtualized server environment based on virtual machine monitoring applications.

In addition, this disclosure relates to a cloud computing system which comprises a plurality of computing nodes, an application programming interface associated with the plurality of computing nodes, and at least one storage unit. The system can include a controller configured to operate on each of the plurality of computing nodes and to select software operating on the associated node. Further, the system can also include a distributed control plane in communication with the infrastructure controller and the storage unit, and configured to launch and manage instances on one or more of the plurality of computing nodes. A permissions system configured to associate one or more permissions to one or more instances and authorize the launching and managing of one or more instances on the distributed control plane.

In the system, the permissions system includes being configured to determine, from a plurality of permissions, at least one user permission to authorize the at least one user to act upon an object of the one or more instances. In addition, the permissions system can include being configured to be determine, from the plurality of permissions, an object permission for an object upon which an action is to be performed. The object can be a machine image from which data is accessed. The object can also be executed code. Further, the object can be a data store.

In the system, the plurality of computing nodes can be hierarchically organized into clusters, wherein each cluster includes a cluster controller. The infrastructure controller can be configured to run Dynamic Host configuration protocol to provide dynamic IP address allocation for one or more of the plurality of computing nodes. Also in the system, the infrastructure controller can be further configured to utilize Domain Name System for naming and IP address look up. In the system, the infrastructure controller is further configured to utilize a Trivial File Transfer protocol and a web server can provide software across a network during installation.

Also in the system, the control plane may further include a cluster and workload component, authentication and permissions component, monitoring component, metering and billing component. The system can further comprise a network component configured to interface with the infrastructure controller and control plane, and configured to interface with one or more network systems external to the cloud computing environment. In addition, the system can comprise a federation module configured to communicate with and launch instances to remote cloud sites. In the system, the control plane can further be configured to manage data files using a Distributed File system. The system can further comprise an identity management and policy engines configured to provide policy control across networks. The system further extends to comprise a metering, billing, and collection engine configured to manage consumption accountability. Further, the system can include a virtualization layer configured to virtualize resources on each node.

Moreover, this disclosure relates to a system for networking in a cloud computing environment. The system comprises a plurality of virtual machines at each of the plurality of computing nodes, each virtual machine configured to communicate with a virtual network layer at a virtual interface via at least one virtual Ethernet (vEthernet), and a permissions system configured to determine an authorization of a virtual machine's access to communicate with the virtual network layer via at least one vEthernet. In addition, the system includes a network control layer in communication with the plurality of virtual machines, the network control layer configured to, upon receiving authorization from the permissions system, provide at least one virtual network service to the plurality of virtual machines and provide an IP gateway to a network via at least one vEthernet at each virtual interface, and a physical communication interface configured to facilitate communications with the network control layer and a substrate Ethernet for routing communications between the IP gateway and the network.

In the system, the network control layer can include a virtual DHCP server configured to provide address allocation instantiated on the vEthernet. Also in the system, the network control layer can include a virtual DNS server configured to provide a local address resolution service. In the system, the network control layer can further be configured to associate with other networks via one or more virtual Ethernets to provide ingress and egress IP routing. In the system, a customer of the cloud computing environment can have authority to create more vEthernets or delete existing ones. Each of the virtual interfaces of the plurality of virtual machines is associated with a single vEthernet. Each of the virtual interfaces associated with at least one vEthernet can be subject to at least one from a group consisting of administrative authorization, filtering, or one or more rate limiting policies.

Further, the system may extend to each virtual interface on a vEthernet being configured to be like a physical interface connected to a physical Ethernet switch. In the system, the network control layer can further configured to route vEthernet communications to the network to access a customer's IP network. Also in the system, the network control layer can further be configured to use a customer's existing internet firewalling, proxying or NAT when vEthernet communications are routed between the IP gateway and the network. The network can be a virtual LAN. The network can be an IP network.

In addition, the plurality of virtual machines can further be configured to accept dynamically created one or more vEthernets and associate the created vEthernets with an instance using the virtual interface. The network control layer can further be configured to support full layer 2 networking functionality. Further, the system may extend the network control layer that is further configured to enable a point-to-point tunnel carrying a layer 2 frame across a layer 3 network. In the system, the network control layer can further be configured to aggregate point-to-point tunnels to provide a virtual layer 2 overlay network topology layered on top of an arbitrary layer 3 network topology.

Also in the system, the permissions system can be configured to determine, from a plurality of permissions, a user permission granting authorization to access communications to the network via one or more virtual machines on at least one vEthernet. The permissions system can also be configured to determine, from the plurality of permissions, an object permission for an object upon which an action is to be performed via one or more virtual machines on at least one vEthernet.

Further, this disclosure relates to a method for networking in a cloud computing environment having a plurality of computing nodes. The method comprises upon receiving authorization, communicating with a plurality of virtual machines to provide at least one virtual network to service to the plurality of virtual machines, wherein each of the plurality of virtual machines communicate with a virtual network layer at a virtual interface via at least one virtual Ethernet (vEthernet). In addition, the method includes providing to the plurality of virtual machines an IP gateway to a network, facilitating communications between the IP gateway and the network, and routing communications between a network control layer and at least one network.

In the method, the network control layer can include a virtual DHCP server configured to provide address allocation instantiated on the vEthernet. Also in the method, the network control layer can includes a virtual DNS server configured to provide a local address resolution service.

The method can further comprises associating with other networks via one or more virtual Ethernets to provide ingress and egress IP routing. In the method, a customer of the cloud computing environment may have authority to create more vEthernets or delete existing ones.

In addition, the method relates to each of the virtual interfaces of the plurality of virtual machines being associated with a single vEthernet. The virtual interfaces can be associated with at least one vEthernet that is subject to at least one from a group consisting of administrative authorization, filtering, or one or more rate limiting policies. Further, the method may extend to virtual interfaces on a vEthernet being configured to be like a physical interface connected to a physical Ethernet switch.

In the method, routing communications between a network control layer and at least one network can include routing vEthernet communications to the network to access a customer's IP network.

Also in the method, routing communications between a network control layer and at least one network can include using a customer's existing internet firewalling, proxying or NAT when vEthernet communications are routed between the IP gateway and the network.

The method can further comprise accepting dynamically created one or more vEthernets and associating the created vEthernets with an instance using the virtual interface.

The method can include supporting full layer 2 networking functionality. In addition, it can include enabling a point-to-point tunnel carrying a layer 2 frame across a layer 3 network. It can further include aggregating point-to-point tunnels to provide a virtual layer 2 overlay network topology layered on top of an arbitrary layer 3 network topology.

Further, the method can comprise determining, from a plurality of permissions, a user permission and granting authorization, based on the user permission, to access communications to the network via one or more virtual machines on at least one vEthernet. The method can further comprise determining, from the plurality of permissions, an object permission for an object upon which an action is to be performed via one or more virtual machines on at least one vEthernet.

In a cloud computing environment having a plurality of computing nodes, wherein each node comprises a host operating system, a virtual interface, and network control. This disclosure extends to a method for networking in the cloud computing environment at a source node. The method comprises allocating a source address associated with the source node to each virtual interface, receiving authorization for a network transmission of one or more Ethernet frames, wherein the network transmission is a scalable multicast of Ethernet frames on a vEthernet, and intercepting Ethernet frames in a networking control plane. In addition, the method includes determining, at a mapping service site, a destination address of a destination virtual interface for an intercepted Ethernet frame, determining whether a policy allows communication between the source node and a destination node based on the source and destination addresses, installing a tunnel to the destination node based on the destination address; and transmitting the intercepted Ethernet frame to the destination node.

In the method, the intercepted Ethernet frames can be encapsulated for transmission and decapsulated upon receipt in a destination control plane. Also in the method, the policy determination can be made by consulting a permissions service. In the method, the tunnel can be an L2TPv3 tunnel.

Also in the method, the mapping service can provide a global lookup between MAC addresses of virtual interfaces and IP addresses of the source node host operating system. The method can further comprise implementing MAC spoof prevention in the network control on the host operating system.

In the method, the network transmission can include a unicast of Ethernet frames between virtual interfaces on the same vEthernet. In addition, the network transmission can be a virtual machine IP network initialization. The method can further comprise facilitating multicast DNS on the vEthernet. The network transmission can include a unicast of IP packets between virtual interfaces on the same vEthernet. Also the network transmission can include a multicast of IP packets between virtual interfaces on the same vEthernet or include a broadcast of IP packets between virtual interfaces on the same vEthernet.

In a cloud computing environment having a plurality of computing nodes, wherein each node comprises a host operating system, a virtual interface, and network control. This disclosure also extends to a method for networking in the cloud computing environment at a source node. The method comprises allocating a source address associated with the source node to each virtual interface, and receiving authorization for a network transmission of one or more Ethernet frames, wherein the network transmission is a scalable broadcast of Ethernet frames on a vEthernet. In addition, the method includes intercepting Ethernet frames in a networking control plane, determining, at a mapping service site, a destination address of a destination virtual interface for an intercepted Ethernet frame, determining whether a policy allows communication between the source node and a destination node based on the source and destination addresses, installing a tunnel to the destination node based on the destination address; and transmitting the intercepted Ethernet frame to the destination node.

In the method, the intercepted Ethernet frames can be encapsulated for transmission and decapsulated upon receipt in a destination control plane. Also in the method, the policy determination can be made by consulting a permissions service. In the method, the tunnel can be an L2TPv3 tunnel.

Also in the method, the mapping service can provide a global lookup between MAC addresses of virtual interfaces and IP addresses of the source node host operating system. The method can further comprise implementing MAC spoof prevention in the network control on the host operating system.

In the method, the network transmission can include a unicast of Ethernet frames between virtual interfaces on the same vEthernet. In addition, the network transmission can be a virtual machine IP network initialization. The method can further comprise facilitating multicast DNS on the vEthernet. The network transmission can include a unicast of IP packets between virtual interfaces on the same vEthernet. Also the network transmission can include a multicast of IP packets between virtual interfaces on the same vEthernet or include a broadcast of IP packets between virtual interfaces on the same vEthernet.

In a cloud computing environment having a plurality of computing nodes, wherein each node comprises a host operating system and a virtual interface, and network control. This disclosure further extends to a method for networking in the cloud computing environment. The method comprises allocating a source address associated with a first source node to at least one virtual interface at the first node, receiving authorization to transmit one or more packets from a virtual interface of the first source node, and determining at least one destination addresses for a packet from the one or more packets. In addition, the method includes determining that a policy allows communication between the first source node and a first destination node, installing a first tunnel to the first destination node based on the at least one destination address, transmitting the packet to the first destination node, and allocating a source address associated with a second source node to at least one virtual interface at the second node. Further, the method includes receiving authorization for a network transmission of the packet from a virtual interface of the second source node, determining at least a second destination address for the packet, determining that the policy allows communication between the second source node and at least a second destination node based on the second source and second destination addresses, and installing at least a second tunnel to the second destination node based on the second destination address.

The method can further include transmitting the packet to the second destination node. In the method, the first destination node and second source node can be the same node. The method can further include receiving the packet at the second source node and copying the packet at the second source node. In the method, a copy of the packet can be transmitted to the second destination node.

The method can further comprise determining a plurality of destination addresses for the packet, determining that the policy allows communication between at least the second source node and a plurality of destination nodes, and installing a plurality of tunnels to the plurality of destination nodes. The method further includes receiving the packet at each of the destination nodes and copying the packet at each of the destination nodes prior to transmitting the packet to the next destination node. Further, the method may extend installing the plurality of tunnels to the plurality of destination nodes includes installing each tunnel in sequential order.

In addition, this disclosure extends to a system for networking in a cloud computing environment having a plurality of nodes. The system comprises a plurality of virtual machines at each of the plurality of computing nodes, each virtual machine configured to, communicate with a virtual network layer at a virtual interface via at least one virtual Ethernet (vEthernet), and a permissions system configured to determine an authorization of a virtual machine's access to communicate with the virtual network layer via at least one vEthernet. In addition, the system includes a network control layer in communication with the plurality of virtual machines, the network control layer configured to, upon receiving authorization from the permissions system, provide at least one virtual network service to the plurality of virtual machines and a default IP gateway to a network via at least one vEthernet at each virtual interface, and a communication interface in communication with the network control layer and a communication line configured to route communications from the network control layer to the network.

In the system each of the virtual interfaces of the vEthernet can be assigned a local IP address. The default IP gateway can be configured for direct access, without address translation. The direct access can be applicable where the local addressing scheme is non-overlapping with another network reachable via the default IP gateway. In addition, the default IP gateway can be configured to provide Network Address Translation (NAT)', wherein the NAT is on egress and a static destination NAT is on ingress.

The permissions system can be configured to determine, from a plurality of permissions, a user permission granting authorization to access communications to the network via one or more virtual machines on at least one vEthernet. The permissions system can also be configured to determine, from the plurality of permissions, an object permission for an object upon which an action is to be performed via one or more virtual machines on at least one vEthernet.

Moreover, this disclosure extends to a method of billing usage of a cloud computing environment. The method comprises metering usage of one or more resources within the cloud computing environment by one or more users, wherein the one or more users is associated with at least one entity, converting the metered usage of one or more cloud resources to a revenue-generating value, billing the revenue-generating value to the at least one entity associated with the one or more users, collecting revenue from the at least one entity for the metered usage of one or more cloud resources, and sharing the collected revenue to a plurality of parties.

In the method, the collected revenue can be shared by at least one service provider of the cloud computing environment. Also in the method, the collected revenue can be shared by at least one service provider of the cloud computing environment and at least one service vendor. The one service vendor can be a software vendor. Also in the method, the service vendor can add one or more functionality to the infrastructure of the cloud computing environment.

The metering of usage of one or more cloud resources can include at least one from a group consisting of: one or more compute resources used on a per time basis, one or more read and write I/O operations, and network bandwidth usage. The metering usage can be conducted at one or more of an applications programming interface (API). The metering usage can be conducted at a storage backend.

Further, this disclosure extends to a method of billing usage of a cloud computing environment. The method comprises interpreting one or more rules based on a billing configuration, wherein each rule includes a rule name, a sequence of a plurality of predicates associated with the rule name and with one or more billing or accounting values, and one or more actions that take place once the sequence of a plurality of predicates are determined to be true, the one or more actions being a recordation of one or more billing or accounting values. In addition, the method includes associating one or more accounting configurations with usage of one or more cloud resources, associating one or more entities with a set of account settlement rules, generating at least one report or payment file based on rule information, accounting configuration information, and one or more entities information.

In the method, the at least one report or payment file can include data that records the consumption of one or more cloud resources.

Also in the method, the account configuration can include an account name referenced by the one or more rules, account information associated with banking details, information associated with a business cycle, a debit value performed to the account information in a current business cycle for the account information, and historic debit and credit value information. In the method one or more of the accounting configurations can be a clearing account against which one or debits or credits are performed when a payment file is generated. Also, in the method at least one of the plurality of predicates can include an expression that tests the value of a tag in a usage record.

In addition, the method can relate to the tag being associated with a value that identifies an account. The method incorporates at least one of the billing or accounting values includes a sequence of tag values that provide a detailed breakdown of the calculation of an account's value.

Further in the method, one or more rules can include a plurality of rules and the number of the plurality of rules is shortened by tuple sets that specify meta rules. Interpreting one or more rules can include determining shared billing allocations. Interpreting one or more rules can also include determining revenue share allocations among a plurality of entities. The revenue share allocations can include revenue allocations divided by at least one service provider of the cloud computing environment and at least one service vendor.

In the method, at least one service vendor can be a software vendor. Further, in the method at least one service vendor can add one or more functionality to the infrastructure of the cloud computing environment.

This disclosure relates to a system for billing usage of a cloud computing environment. The system comprises a billing engine configured to interpret one or more rules based on a billing configuration, wherein each rule includes a rule name, a sequence of a plurality of predicates associated with the rule name and with one or more billing or accounting values, and one or more actions that take place once the sequence of a plurality of predicates are determined to be true, the one or more actions being a recordation of one or more billing or accounting values. In addition, they system includes a configuration module configured to provide one or more accounting configurations to the billing engine, the one or more accounting configurations further including one or more accounts associated with usage of one or more cloud resources and one or more entities associated with a set of account settlement rules, and a presentation layer configured to collate information from the rule engine and configuration module and generate at least one report or payment file.

BRIEF DESCRIPTION OF THE DRAWINGS

For a better understanding of the systems and methods described in this application, reference should be made to the description below, in conjunction with the following drawings, in which:

FIGS. 3A and 3B are block diagrams illustrating greater detail of the system shown in FIG. 1, according to some embodiments.

FIGS. 9A to 9C are a schematic, a "directed graph," and a flow chart illustrating permissions, according to some embodiments.

FIG. 12 is a block diagram illustrating storage control in further detail for the system shown in FIG. 1, according to some embodiments.

DETAILED DESCRIPTION

Figure 1:
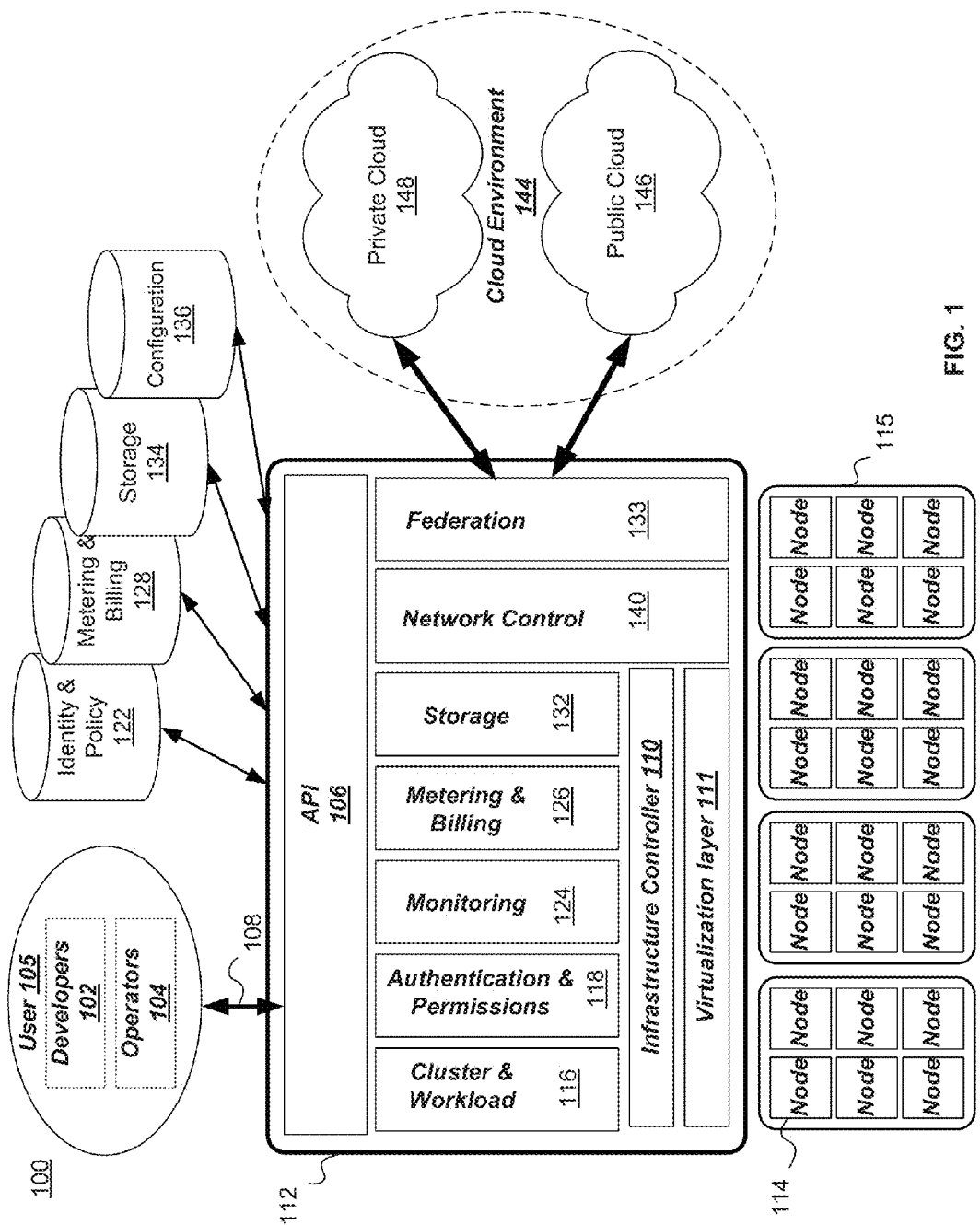
FIG. 1 is a schematic illustrating in overview the cloud computing system, according to some embodiments.

In the following detailed descriptions, numerous specific details are set forth to illustrate the subject matter presented in this document. It will, however, be apparent to one of ordinary skill in the art that the subject matter may be practiced without these exact specific details. Moreover, the descriptions are provided by way of example and should not be used to limit the scope of any later claimed inventions.

Introduction

The cloud computing operating system described in this document provides cloud computing operations and management for a public cloud infrastructure or for a private cloud infrastructure behind a company's firewall. This system includes administrating and managing data processes and data structures in a digital data processing system whether in a virtual machine or otherwise, allocating digital data processing system resources, and distributing workload among operational computers, processors and other system resources. More specifically, the system allows existing infrastructure to be repurposed to build a computing cloud in the trusted environment of a company's own data center. Once operational, the system can be used to allow access to on-premise and off-premise cloud services via a common application programming interface (API), thus allowing the use of internal resource capacity and controlled access to additional external computing power and capability.

In some embodiments, the system abstracts the underlying technology infrastructure to provide a virtual data center. Beneath this virtual data center abstraction sits a physical layer of storage, network and computing hardware all of which are managed by multilayer control software. The system integrates the hardware virtualization with node management software on each node to achieve deployment and configuration. The system also supports controlled federation to external private and public clouds like Amazon Elastic Compute Cloud (EC2) as needed, for example, during peak times and for specific applications. As the system has no single point of failure, it employs fail over mechanisms for system integrity and resilience. A policy-based authorization system and network isolation supports multi-tenancy.

Various components enable the cloud computing operating system. Specifically, the computing backbone of the system is a "cluster" of a number of computers, referred to as nodes that are connected to a network. All the nodes are controlled by an Infrastructure Controller that ensures services run correctly across the cluster at all times.

The Infrastructure Controller runs as a distributed service across all nodes, and enables the cluster to be self-healing and self-organizing. To do this, at any given time one node is designated as the Infrastructure Controller master, a number are designated as Infrastructure Controller sub-masters and the rest act as Infrastructure Controller workers. The Infrastructure Controller master delegates tasks to Infrastructure Controller workers to start and stop services and, along with Infrastructure Controller sub-masters, receives notifications of service state changes. When the master fails, the sub-master becomes aware of the failure and elects a new Infrastructure Controller master, ensuring system resilience.

The system's storage control allows users to create and delete virtual storage volumes dynamically and associate these with instances anywhere. Users have control over the placement of their storage in the cloud so as to manage contention, performance and fault tolerance with respect to attached instances. Storage capacity can be added on demand and can be incorporated automatically into the storage control system.

The system facilitates the creation of dynamic virtual network topologies, independent of the underlying network topology. It also provides security based on policy instead of network topology. Users are able to create virtual Ethernets (vEthernets) dynamically using existing networking and associate these with instances using virtual network interfaces (vNICs). The system supports full layer 2 networking functionality, including broadcast, multicast and non-IP traffic.

The system also gathers and collates monitoring information, which can then be accessed via a web interface and integrated with monitoring software.

The system can also provide for the automated build-out of a site, starting with a "seed machine," which is then replicated across nodes. Each replicated node is then able to install other nodes. The system has a decentralized control plane, in which many, if not all nodes are identical and cooperate to "elect" master and secondary nodes, which once "elected," start and manage all the services.

In the system, a site controller bids out to cluster controllers for placement of workloads. The site controller requests for the status of resource availability from one or more clusters. The site controller receives responses from the cluster controller and chooses the 'best fit' from the responses, then lets the other cluster controllers know they have "lost."

Placement and workload management can be achieved through "anti-entropy" where a persistent ideal, or desired, state is continually compared with the actual state of the system, and appropriate adjustments are made. In terms of such an approach, a durable representation of an ideal state of part of the system is stored (e.g. in a database), for example by storing a launch-plan requested by a user. An ongoing "anti-entropy" process compares the actual state of the system against the ideal state specified in the launch plan, and applies any changes to the actual system to make its state consistent with the ideal state, which may require placement of new workloads, termination of others, adjustment of networks, or other actions. As a concrete example, an element of the launch plan specifying ideal state could be that the user X has requested that 'N instances of image Y is running' If one or more nodes hosting X's instances crash, the real state becomes inconsistent with this, since fewer than Y instances would be running. The anti-entropy process detects this, and launches replacement instances.

The system can also use arbitrary tags to guide placement of virtual machine workloads. This placement is simplified through the use of Boolean placement constraints (tags).

Also important is that the system uses two permissions in which both a user-permission and an object-permission may be met for an action to take place. The permissions system can be used to control and implement rules-based network access (i.e. the fact that networking relies on to the 2-part permissions system).

Also, the system uses a hierarchical namespace scheme for users and objects in a multi-tenant cloud environment—i.e. hierarchical naming of customers, groups, images. This hierarchical naming system allows permissions to be inherited down the naming hierarchy (Thus, a permission granted to group /a/b also applies to group /a/b/c).

Further, the system applies rules-based billing and revenue splitting to a cloud environment.

Storage placement is optimized in the system. When placing virtual storage volumes, the storage control system automatically decides how and where to instantiate a new virtual storage volume based on requested attributes of the storage volume ('local optimization'), and a library of strategies each designed to globally optimize for different criteria ('global optimization').

One global optimization strategy may, for example, be designed to pack storage volumes as densely as possible, such that empty servers may be powered-down. An alternative strategy may be to spread I/O operations per second (IOPS) load evenly across the underlying physical storage devices so as to maximize average, median or percentile IOPS performance across the fleet. A third strategy may be to spread read and/or write throughput across the network so as to minimize global network contention.

For local optimization, the requested attributes of a given storage volume are used to determine which one of a set of possible physical instantiation strategies will be used, within the constraints of the global optimization strategy. For example, a "high performance" virtual storage volume may be instantiated either as a logical volume on a RAID set across co-located physical drives or as a network-distributed block store across physically disparate drives.

The system allows a point-to-point tunnel carrying layer 2 frames across layer 3 networks by aggregating these point-to-point links to provide a virtual layer 2 overlay network (e.g. virtual Ethernet), layered on top of an arbitrary layer 3 network topology. This enables simulation of broadcast and multicast semantics using point-to-point unicast between disjoint broadcast and multicast domains (e.g. across the internet). These and other features and characteristics of the system are described in greater detail below.

As a preliminary matter, it is useful to "set the stage" by describing certain initial concepts.

(a) Customer

In the cloud management system described in this patent application, a customer represents an organization or individual using a service in a cloud computing environment and who is responsible for the costs incurred. In other words, a customer is a billable entity within the system. A customer may have several accounts, which are the billing units within the system. As described later, a customer may have multiple individual users who can, for example, be assigned to different groups. Each customer has an identity provider that provides the necessary authentication tokens to gain access to services. The identity provider may act as a proxy for other identity providers, and may act as an alternative entry point to the identity provider service.

Thus, customers may be groups of users of the service, and are also the entities that are billed for use of the service(s). All users belong to some customer, and a customer hierarchy definition provides a unique naming scheme for users. New customers are created as either organizational customers or individual customers.

(b) Delegation

Authorization in the system follows a delegation model. Any entity may delegate its privileges to another entity in the system. Delegation of privileges is encoded in a permission, which defines (a) the authorizer, being the entity delegating its privileges; (b) the entity to which the privileges are being delegated; (c) the object for which privileges are being delegated, and (d) the specific privileges that are being delegated.

(c) Entities

Entities are the units in the system for which privileges are managed. These entities are identified by a prefixed path name format. For example the user bob of customer acme will be referred to as the entity user: /acme/bob. In a similar fashion, a group of technical support personnel of the customer acme, based in their Europe branch may be represented by the entity group: /acme/europe/tech.

(d) Group

A group or user group is a collection of users (see below) within the system. Permissions can be granted to a group, and all members of the group and its subgroups inherit these permissions. A group allows customers to manage policies for collections of users, making it simpler to grant and revoke permissions to individual users through assigning and removing them from groups.

(e) User

A user is the entity that makes requests for services. Users belong to a single customer, and are the representation in the system of actual end-users which interact with the service. Each user has a password or other credential. These may be managed by the system itself in the case that the system provides user authentication, or it may be managed externally.

With this as an introduction, the system 100 is described in greater detail below.

System Overview

From initiation through expansion and end-of-life, the cloud computing systems described in this application are built from "bare metal" (i.e., computers without an installed operating system), integrated into a cloud and managed in a hands-off environment. To enable this requires a number of components, including:

An infrastructure controller in the form of software which is installed and runs locally at each node, to run other software applications on various nodes. This operates in a distributed fashion and allows automatic "discovery" of already running instances of the infrastructure controller and automatic membership.

A configuration of various standard software, such as DHCP and TFTP server software. This allows automatic installation of cloud management software on new nodes added to the network.

Software that performs install-time tasks to enable newly installed nodes to integrate into the cloud.

A node controller in the form of software installed locally at each node to register with the cluster and site controllers.

FIG. 1 is a block diagram illustrating these components of the cloud computing management system 100. The main components of the system 100 include a distributed control plane 112 that is controlled by an infrastructure controller 110. The control plane 112 runs the virtual machine(s) at nodes 114 during operation, and includes various subcomponents such as a cluster and workload services subcomponent 116; an authentication and permissions subcomponent 118; a monitoring functionality subcomponent 124; metering and billing functionality 126; and a storage control subcomponent 132. These are described in detail below.

The control plane 112 and the associated infrastructure controller 110 are replicated on each of a plurality of nodes 114. Because many of the nodes 114 are configured to have the features of the control plane 112 and infrastructure controller 110, any one of these nodes 114 can be elected or assigned to be a master or sub-master node of the system 100.

Node 114 is the most basic building block of the system 100. It is basically a single machine running the node software. Nodes 114 are clustered into node clusters 115 and are instructed by their respective cluster controllers (not shown) to run instances. The nodes 114 in a cluster 115 are hierarchically organized into a single unit upon which instance placement and service management is performed. Grouping of clusters 115 are known as sites (not shown). Thus a site is composed of a number of clusters 115, which group together the actual machines that make up a data center.

FIG. 1 also shows a network control component 140 at each node 114. It interfaces with the control plane 112, and the infrastructure controller 110. The network control component 140 additionally interfaces with a cloud computing environment 144, which may include one or more private cloud environments 148 and/or public cloud environments 146.

Additionally, the system 100 includes storage 134, metering and billing databases 128, and identity and policy databases 122, as shown. In some situations, the storage 134, the metering and billing databases 128, and the identity and policy databases 122 may be integrated with the control plane 112. Storage can also be accessed at an external storage location.

The system 100 also includes an application programming interface (API) 106 to run the various cloud management applications and features, from which a user 105, such as developers 102 and operators 104, may interact with various applications of the system 100.

A federation module 133 allows for the control plane 112 to communicate with other cloud sites. It allows for launching instances in remote sites. Instances may be either of the system 100 or of public and private clouds 146, 148 to, for example, run software applications. Federation is achieved by using standard APIs that create an "on-ramp" to public clouds for suitable workloads and is facilitated by a centralized registration/authorization service.

The infrastructure controller 110 controls which software runs on which nodes, thereby controlling features of the system such as installation, file storage and database services. The configurations of the software accessed and managed by the infrastructure controller 110 may be stored in a configuration database 136. As with storage 134, the configuration database 136 may be local and part of the infrastructure controller 110 or may also be externally located.

The infrastructure controller 110 typically also runs Dynamic Host Configuration Protocol (DHCP) to provide dynamic IP address allocation for the node. Other computer networking protocols may also be utilized for IP address allocation and other configuration information. The infrastructure controller 110 additionally uses Domain Name System (DNS) for naming and a Trivial File Transfer Protocol (TFTP) and a web server for providing software across the network during installation.

A virtualization layer 111 runs on every node 114 and provides a mechanism to virtualize, or abstract, the resources available on a node so as to share those resources amongst a number of consumers of the resource. This can be implemented using a hypervisor such as Xen or KVM.

The control plane 112 allows instances to be launched and managed. Instances are launched by creating a "launch plan," which specifies a disk images and other relevant specifics of one or more desired virtual machines.

In some situations, the control plane 112 manages data files using a Distributed File System (DFS), such as HDFS (Hadoop). A DFS is a separate distributed storage service that provides replicated storage space which is distributed over many disk drives available in the site. This allows fast access to a machine image for quick duplications. The design of DFS allows for on-the-fly adding and removal of machines, so that failed machines can be removed, and new machines added. It will, however, be appreciated that any other standard may be implemented or other distributed file systems may be utilized.

The system 100 may additionally include fault-tolerance features. A fault-tolerant storage service is used by a key value storage, which is a database-like layer used in the system 100. This provides a mechanism for the database storage for the identity and policy components 122, the metering and billing component 128 and the storage component 134. Any storage service known in the art may be utilized, which may or may not rely on key value storage.

As will be described further, the system 100 also includes identity management and policy engines 122 that together create environments for application policy control across networks; and metering, billing, and collection/payment to ensure consumption accountability.

Each of these components will now be described, in greater detail.

Data Center Build-Out

Figure 2:
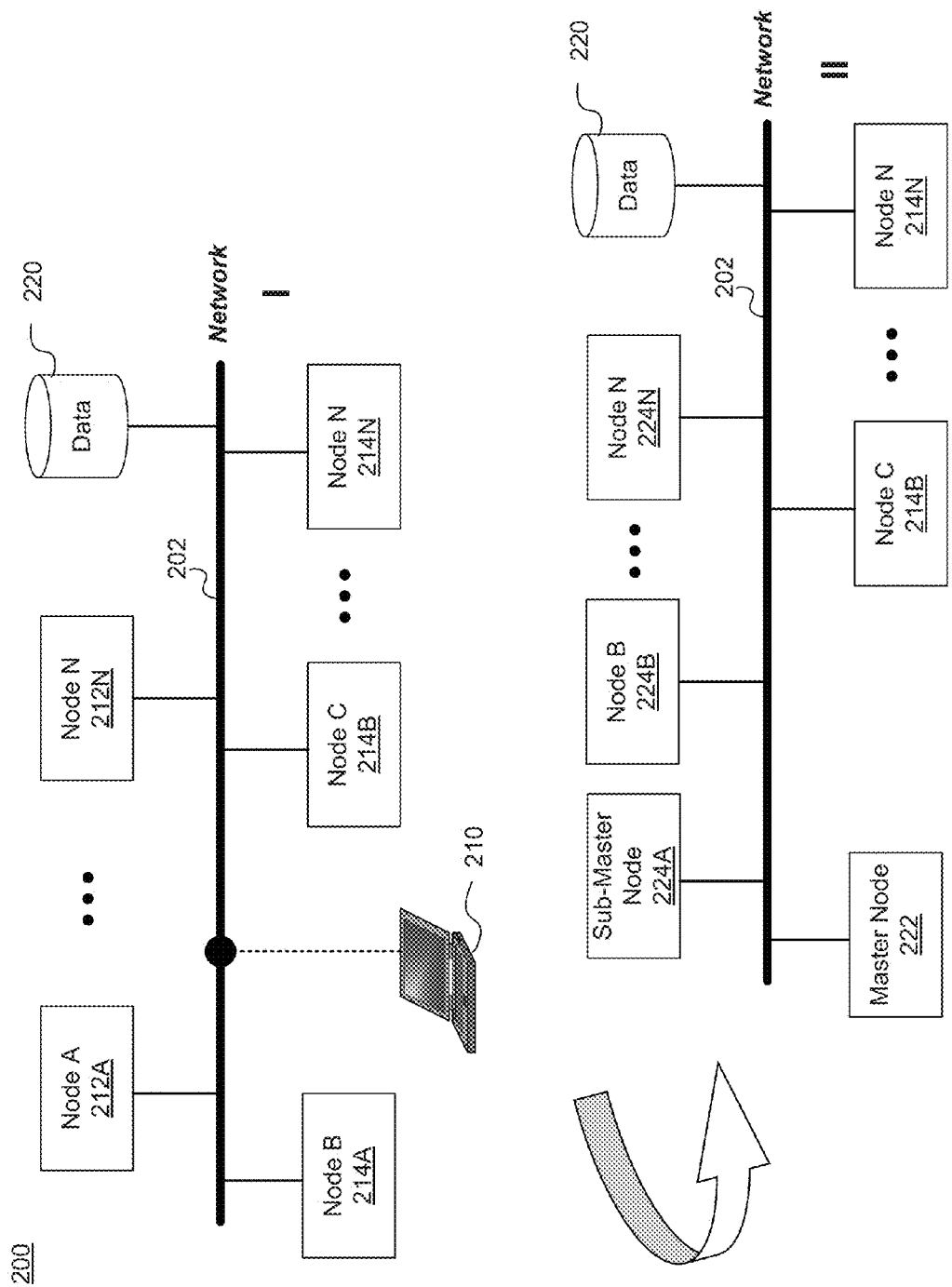
FIG. 2 is a schematic network diagram illustrating installation of the operating system for the cloud computing system, according to some embodiments.

FIG. 2 illustrates a system 200 for installing the cloud management system 100 of FIG. 1, according to some embodiments. At installation time and during the normal operation of private cloud 148, the infrastructure controller 110 shown in FIG. 1 is responsible for ensuring that the software necessary to provide installation or operational services are running correctly.

At initial launch, the infrastructure controller 110 provides an automated build-out for the system. A variety of computing devices, for example node A 212A, 214A to node N 212N, 214N are connected to a network 202. Computing devices may include, but are not limited to servers, desktop computers, servers, and so on. Each network 202 may additionally include one or more storage devices 220.

In general, the distributed operation of the infrastructure controller's 110 is controlled by a master node 222, to which other nodes 224A to 224N and 214B to 214N, known as workers, are connected. A number of nodes 224A to 224N connecting to the master 222 are nominated as sub-masters, e.g., node 224A, which receive information about any decision or instruction executed by the master. In the case of failure or decommissioning of the master node 222, (e.g., any time the master is removed from the network, becomes unreachable, and so on) the sub-masters from among nodes 224A to 224N participate in an election amongst themselves to designate another master node.

The infrastructure controller 110 on the master node 222 makes decisions about which software applications should be executed on various nodes on the network 202, and sends instructions to the relevant worker nodes from among nodes 224B to 224N and 214B to 214N to effect the execution. Control of which software must be run may be a configuration item contained in the configuration database 136 (FIG. 1). The configuration database 136 specifies the characteristics of the control plane software and is initially specified in a file on the seed system at seed device 210. It may subsequently be modified, for example, by a system administrator after initial installation to reflect changes in the system 100 over time. The configuration database is distributed across a subset of the nodes 224A to 224N and 214B to 214N, and a consensus protocol between these subset of nodes 224A to 224N and 214B to 214N ensures consistency of the configuration database.

At initialization (Stage I), a seed device 210, such as a laptop computer, is connected to the network 202 to initiate the cloud computing management configuration. The seed device 210 includes a repository of software necessary to install the nodes that exist within the cloud management system 100. Installation is initiated by booting from the network. During the installation, the seed device 210 loads software which is required to run the cloud management system 100 onto one of the nodes 212 to 214. Once Stage I is complete, the seed device 210 can be disconnected from the network 202.

At the next stage, Stage II, one of the nodes 212 to 214 onto which the software has previously been installed from the seed device 210, populates all or some of the other nodes 212 to 214 with the same software. Once that is completed, an election protocol is initiated to determine which device is designated as a master 222 and which device is designated as a sub-master 224. Any of the devices 212 to 224 may be selected to be the master and sub-master(s). With all the devices in network 202 configured and the election of the master 222 and sub-master 224, the cloud management system is ready to operate.

In some embodiments, the election of the master node 222 may occur during Stage I or anytime after Stage II. For example in Stage I, the seed device 210 is a fully functional member of the cloud management system 100, and may initially act as the master node 222. Thus, an election may occur when the seed device 210 boots up, or at any time the seed device 210 leaves the network 202 (e.g., due to failure or decommissioning). In fact, Stage II may be similar to Stage I in that software is merely being installed onto new nodes, and may be repeated for an arbitrary number of nodes throughout the life the cloud management system 100. Thus, in some embodiments, an election for a new master node and sub-master nodes can occur at any time as necessitated by the cloud management system 100.

Infrastructure Controller

Figure 3A:
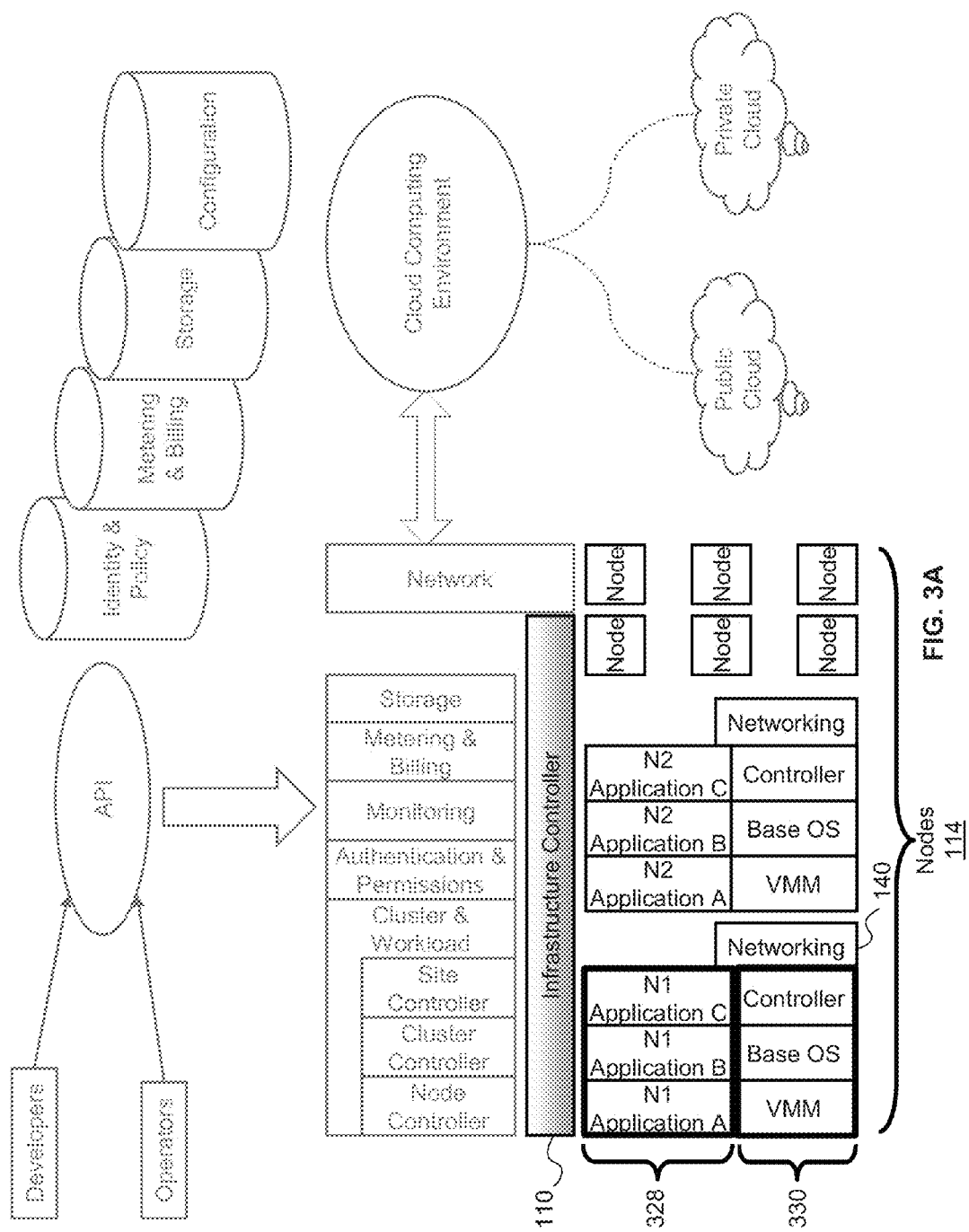

FIG. 3A illustrates the main components of the cloud management system 100 that are controlled by the infrastructure controller 110 according to some embodiments. Once installed, for example in the cloud computing environment 144 (e.g., in either private cloud 148 or public cloud 146), the infrastructure controller 110 runs on every node 114 in the cloud, operates in a distributed fashion, and controls the execution of other software 328, 330 on nodes 114 within the cloud.

The infrastructure controller 110 enables various software 328, 330 to be run on nodes 114 of a network in a distributed fashion. Along with the associated architecture described, it can enable an automated virtualized server environment based on virtual machine monitoring applications, for example Xen and KVM, that integrates numerous functions.

Control Plane

FIG. 3B is a block diagram of the various components of the control plane 112. Once each server/machine has been initialized, the control plane 112 allocates requests for services from users to the appropriate resources in the various systems of the control plane 112, as necessary. Thus, the control plane 112 controls the registration, distribution and management of large numbers of virtual machines as directed by requests received from users through APIs 106 compatible with cloud systems and services being serviced. For example, the control plane 112 uses hypervisor virtualization and the cluster and workload placement subcomponent 116 to allocate infrastructure to application workloads. This creates a dynamic system that aligns infrastructure resources with real-time application demands. Use of the system is constrained through a authentication and permissions subcomponent 118 for managing authentications, permissions, and policies of users and objects. In addition, the workloads may access storage managed by the control plane 112. Usage of the system is monitored for correct operation by the monitoring subcomponent 124, and all usage is metered for billing by the metering and billing subcomponent 126.

(a) Cluster and Workload Services

The control plane 112 provides a set of "cluster" and "workload" related functions and services to organize virtual machines, allocate resources and distribute requests to the nodes 114. To enable this, the control plane 112 includes three controllers; node, cluster and site controllers 322, 324 and 326 respectively.

A node controller 322 executes on each node 114 and provides an interface for launching and managing instances. It is responsible for retrieving images from the image store in HDFS or other distributed or external storage systems known in the art, controlling the hypervisor, and setting up networking connectivity for instances.

A cluster controller 324 is responsible for managing a group of node controllers 322 and providing a higher level interface to compute resources. It keeps track of the available resources and running instances amongst the nodes 114 under its control. When given a launch command by the site controller 326, it instructs the node controllers 322 to start the instances.

The site controller 326 provides the external interface to the compute system of the control plane 112 and infrastructure controller 110, and interacts with one or more cluster controllers 324. Incoming requests for services are authenticated and authorized, and then handed off to one or more cluster controllers 324. The site controller 326 maintains a database of running instances that can be queried by external API clients.

The site controller 326 uses a placement process to decide to which cluster controllers 324 to pass launch requests to. Requests are messages received through the API to the system that specify commands from external users of the system to launch instances, terminate instances, query instances, and to edit or modify various parts of the system. Requests may be individually specified by a user, may be a launch plan, or instructions for executing a launch plan.

Placement is the act of deciding where in a cloud to run an image. There are a number of aspects that must be taken into consideration when choosing to place a new instance. An instance may be a virtual machine run by the service on the control plane 112. Instances have attributes such as allocated RAM, number of CPUs available, virtual block devices and network interfaces attached, and attributes that must be provided by the underlying node. Instances are created using a launch plan that specifies the desired set of machines, which image lists they are to be launched from, and placement relationships that exist between them. It will be appreciated that the placement features and the many functions of the control plane apply to the placement of any type of workload in the cloud computing management system 100, and is not limited to virtual machines.

(i) Image Management

Figure 4:
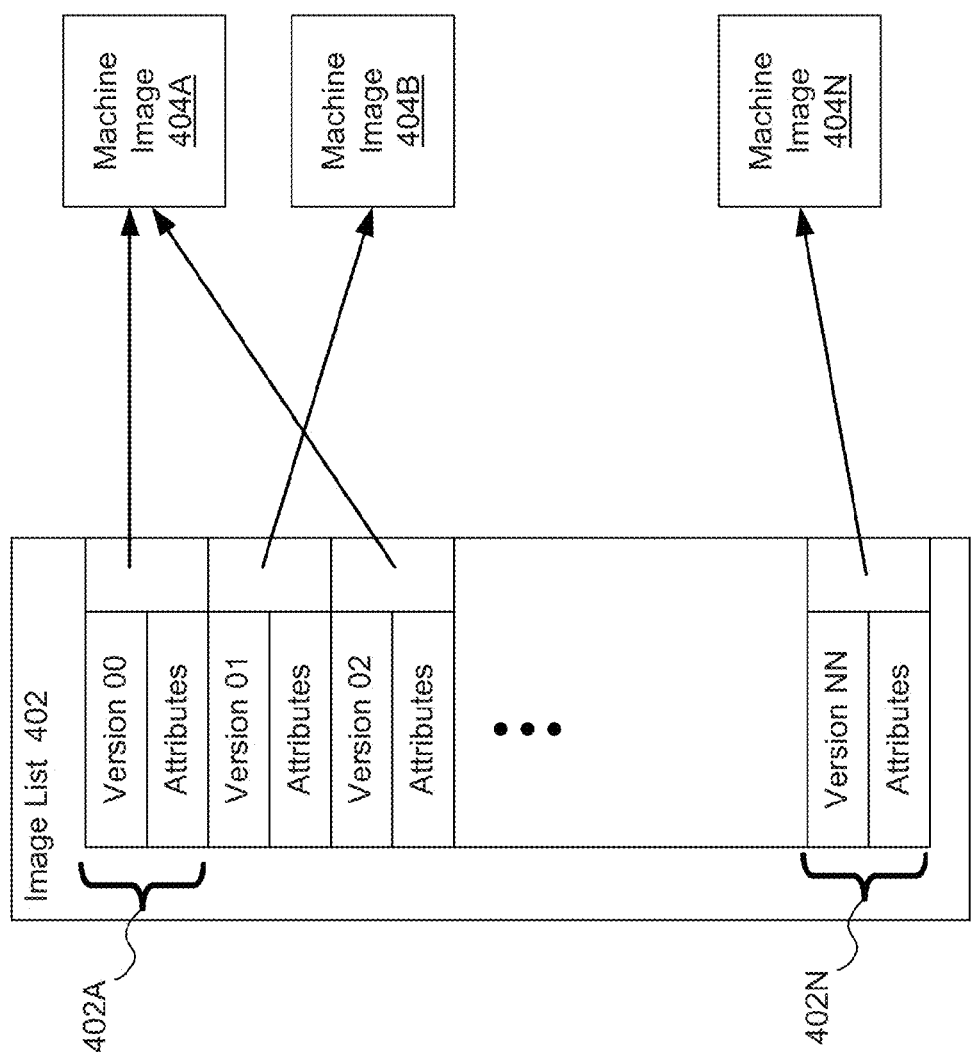
FIG. 4 is a block diagram illustrating an image list and associated machine images, according to some embodiments.

FIG. 4 illustrates the structure of an image list 402 according to some embodiments. Image list 402 may be a container that provides a mechanism to organize applications, which may for example be machine images 404, and are the object specified when a user starts an instance through the launch plan.

Machine images 404 may be virtual disk images from which an instance is launched. A machine image 404 can be launched in a virtual machine. The image may be uploaded when the machine image 404 is created. This image is uploaded into the site's storage when the machine image 404 is created.

The image list 402 may contain a plurality of image lists 402A-402N, each servicing a machine image 404. Machine images 404 are referenced by one or more image lists 402. These references are numbered with versions, which allow a single list to be created for a specific functional requirement, but be updated if problems are discovered with the initial machine image. Thus, multiple image lists 402A-402N may reference a single machine image 404.

In some situations, when a launch plan refers to or specifies an image list 402, it may omit to specify the version of the image in the image list, in which case the image list 402 may specify a default image version. In general, however, the launch plan may specify a particular version of image in the image list as necessary. For example, by running an instance using an image list, which has been created for providing web servers, the latest web server would be launched. If the content to be served can only be served by an earlier version of the web server software, that image version can be explicitly selected. Another use could be an image list for a company's rendering software. As the technical department updates and improves the software, they would be able to add new machine images to a single list. The end user may be unaware of these updates, but would always launch the latest version, as that would be the one specified by the image list's default.

(ii) Launch Plans

Referring back to FIGS. 3A and 3B, a launch plan is a request to execute one or more virtual machines, or instances. It specifies a set of images to be executed, as well as the size of the virtual machines to execute them on, which block and network devices to attach to the machines, and the relationships between the newly created instances. The cluster and workload subcomponent 116 allocates resources using all these parameters and the site controller 322 picks which resource will provide the service in response to a request.

In creating/requesting a launch plan, a user may specify the following constraints:

Shape of the virtual machine to instantiate—A virtual machine's "shape" refers to the combination of the number of CPUs, which may include fractions of CPUs, assigned to the virtual machine, and the amount of RAM made available to it. These shapes are defined on a site-wide level during site instantiation, and new shapes may be added to the site as hardware resources and computational needs change. Shapes form parts of shape families, and nodes and/or clusters can specify which shape families they can provide; in this way, differently-sized underlying hardware can be efficiently divided and pockets of un-usable resources are avoided. The launch plan specifies one of these predefined shapes, and the placement system ensures that the node chosen to run the instance has sufficient resources available to satisfy this requirement.

Arbitrary attribute matching—The user may specify a number of arbitrary attributes which must be matched by the node in which the instance will launch on. These tags are generally opaque to the system 100, but may be used by the end user to ensure that their virtual machine is run in a specific portion of the data center, or, for example, on a machine with extra dedicated network interfaces. This can also be used as a mechanism to implement customer-specific placement requirements.

Relationships with other instances—It is possible to specify network-locality relationships between launched instances. This allows users to, for example, require that two instances are launched on the same physical machine, to facilitate inter-instance communication, or that instances are launched on different clusters, to try and guarantee the highest level of reliability even if there are data center failures.

When a launch plan is received by the cluster and workload subcomponent 116, it first communicates with the Permission 118 subcomponent—to ensure that the user submitting the launch plan has the correct permissions to access the specified image lists, and to create new instances, according to their privileges as dictated by the customer's administrators. If the user does not have the appropriate permissions, the launch plan is rejected, for example by returning an HTTP 401 error.

In some situations, the user submits a launch plan to the site controller 326, specifying a number of instances to launch, each being an image list specification, a size, one or more VNICs, one or more block devices, and a set of arbitrary launch plan attributes to be satisfied. Additionally, inter-instance relationships which must be satisfied are specified, and marker tags to be assigned to the instances are also listed.

(iii) Workload Placement

Generally, the control plane 112 divides resources made available by nodes 114 amongst a number of distinct virtual machines. The control plane 112 recognizes that hardware has a set of characterizations. The available characteristics of each node 114 is established by its node controller when it starts up, and is reported to the cluster controller 324 and site controller 326 for further use in the placement of workloads. Similarly each instance that must be placed on a node has certain requirements, as described above.

If there are not enough resources to run the reservation, an error response, such as an HTTP 503 response, will be returned. On a successful launch, the user/requester will be returned the list of new instances that specify how the instances of the Launch plan relate to each other and to the hardware on which each will execute. The actual relationships or underlying hardware are not returned in the return value.

In some situations the system may use a bidding mechanism for workload placement. The site controller 326 may ask the cluster controllers 324 to bid on how well they can accommodate a given launch plan (or subset of a launch plan). Each cluster controller 324 returns a score. Based on the returned scores, the site controller 326 selects the winner(s), and sends the workloads to selected cluster controllers 324. The other cluster controllers 324 that are not selected are informed that they no longer need to reserve the resources and can free them up.

Placement is a multi-dimensional "bin-packing" undertaking, where items of different sizes are packed along different axes into homogenous bins without the luxury of having the full set of items available to optimize the placement upfront. Technically, this is a computationally complex endeavor as the number of nodes is increased, and therefore requires a simplified approach.

In its simplest operation, various constraints may be simplified. The complexity may be reduced by making many of the constraints binary (i.e. which a node either can or cannot satisfy), and by constraining the shapes to powers of two in all dimensions. This allows an efficient placement algorithm in the system 100. Consequently, even a naive algorithm that prioritizes packing density is sufficient to complete the task at hand.

First, placement attributes are considered as part of a criteria for selecting the appropriate node from the plurality of nodes 114. The placement attributes specify various resource usage measurements which may make nodes unsuitable to place on. Possible placement attributes that may be considered to determine suitability of a node for placement include (but are not limited to):

- Placement efficiency, which determines packing optimization.
- Network availability, which is effectively the inverse of placement efficiency, in that the more instances there are on a node, and consequently utilizing a lot of bandwidth, the less resources are available on that node for new instances. In some embodiments, the user may indicate network expectations in the launch plan using a tag or a relationship between instances.
- Disk IO availability, which, like network availability, may be limited by other instances on the node. If the instances are using scratch disks (node-local storage), there will be contention between high IO instances for the available drive IO. If all storage is network connected this becomes the same problem as above.

Available site-wide resources are determined and the launch plan fails if it is trivially obvious that the required resources are not available.

Once all the required attributes have been examined, a candidate list of nodes on which to place the instances is generated, termed the "slot list."

If no inter-instance relationship requirements are specified in the launch plan, then the slot list step produces the final placement list by simply picking the highest rated slots. If network relationships are defined, the slot list is passed into the networking relationship resolver, which is further described below.

(iv) Relationship Resolution

Figure 5:
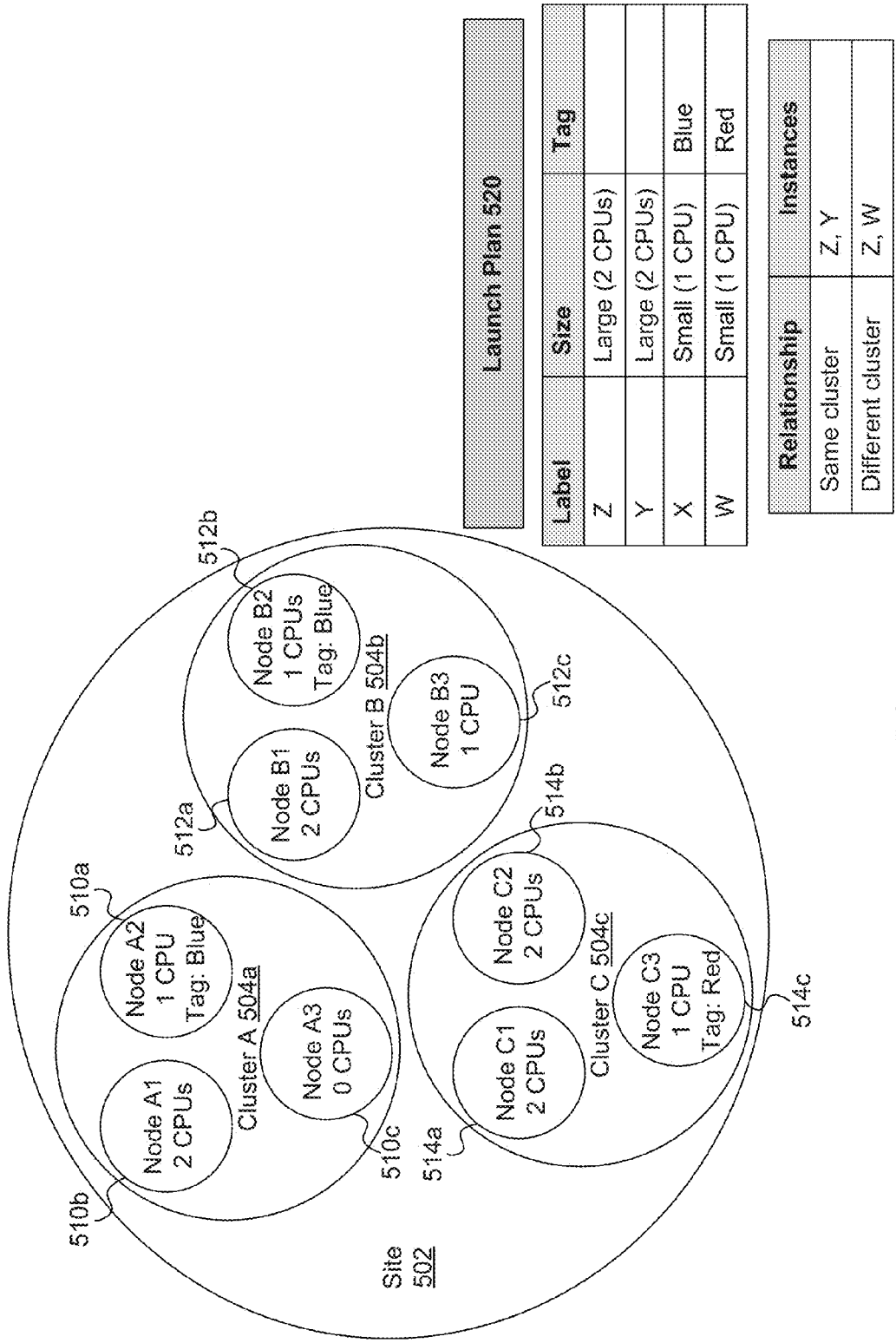
FIG. 5 is a schematic illustrating a site status and launch plan, according to some embodiments.

FIG. 5 is an example illustration of a site status of a site 502 and a launch plan 520 in the system 100 of FIG. 1. The nodes 114 may be grouped into clusters 504*a*, 504*b* and 504*c* of machines 510*a-c*, 512*a-c*, and 514*a-c* based on configurations as interpreted by the Infrastructure Controller 110. The clusters 504*a*, 504*b*, 504*c* are managed by the cluster controller 324. Similarly, multiple clusters 504*a*, 504*b* and 504*c* may be grouped into a site 502, which is managed by the site controller 326 as previously described.

The current status of all nodes is constantly monitored and aggregated at cluster and site levels to provide input into the cluster and workload subcomponent 116. When a launch plan is received, such as launch plan 520, possible slots are identified for determining the best site or clusters for the job from feedback from cluster and site resources. The system determines resource needs from the shape specified for each instance, which defines number of CPUs and amount of RAM required by the virtual machine. For the sake of simplicity, however, in launch plan 520, only CPUs are specified. In the example of the launch plan 520, four instances are requested labeled Z, Y, X, and W, each with a particular size requirement and some with additional attribute requirements.

A list of possible slots for instance placement is generated from the resources available in the clusters and nodes of the site. At this point it may be shown that while total site-wide resources are sufficient to satisfy the requested instances, there may not be sufficient resources available on individual nodes (i.e. Site has 2 CPUs available, the launch plan 520 requests a 2CPU instance, but it's found that the CPUs are on separate nodes).

Relationship requirements are checked and fail the launch if it is not possible to satisfy them. Once a list of suitable slots meeting the criteria of the launch plan 520 has been generated, the relationships between instances must be satisfied. The relationships specified can either be between pairs of instances to be started, or the specified relationships can be between instances to be started and already running instances, in which case the latter would already have been placed (e.g., I want to place a backup database server, so it better not be on the same rack as my already running one). While there may be enough nodes to satisfy the instances requested, their inter-node and inter-cluster configuration may not be able to satisfy specified relationships. For example, the site has two 2 CPU slots available, but they exist on the same cluster, while the launch plan may have specified that the instances must be cluster separated.

If all the above conditions are satisfied, the site 502 will accept the launch plan 520 and return the details of the new instances to the user. Asynchronously, the clusters involved in the launch will instruct the relevant nodes to retrieve the specified image list and initialize the new virtual machine, attaching the virtual block devices and virtual NICs as specified by the plan. The launch plan 520 itself may or may not be persisted.

(v) Optimization

Once all the constraints are satisfied, placement can be optimized for different customer requirements. It can, for example, attempt to focus on placement density, ensuring that subsets of nodes 114 are utilized as much as possible before placing on un-utilized nodes. Alternatively, instances can be spread out across a maximum number of nodes 114, with no regard to each individual node's utilization, so as to minimize load on networking and other infrastructure.

There are a number of ways that placement can be optimized. Some of these optimization methods include, but are not limited to:

- Boot speed—Placements made close to machine image sources speed up the starting of new instances.
- Network usage—Instances may be placed such that the network remains as responsive as possible—e.g., attempting not to saturate switches.
- Packing efficiency—Placement can also be optimized to ensure as small a subset of servers/nodes are as maximally used as possible; this can allow subsections of the data center (which comprises the collective grouping of nodes 114) to be shut down, as the load is concentrated.

If some images are particularly popular, approaches are possible to balance the load.

- Increase replication—DFS allows managing file replication on a case-by-case basis. As blocks are spread out over all available data nodes, it means that each block will be stored on a subset of nodes randomly chosen per block. Essentially, the density of block coverage over the entire cluster increases.

Pre-seed nodes—Nodes can also be pre-seeded with the image file, which would prime the node cache with the popular image and increase the number of nodes available to run the virtual machine in the first-level (cached image) test.

Peer to Peer file transfer—Having the image available on a large number of nodes (those running the image), means that many additional seeds of the image are available to download from, even if the image cannot be run on those nodes, to distribute the file more efficiently.

(vi) Placement Example

Referring back to FIG. 5, for illustration purposes, the site 502 has the following properties. Three clusters 504*a*, 504*b*, 504*c*: A, B, and C. Cluster A 504*a* contains 3 nodes; A1 with 2 CPUs available, A2 with 1 CPU available, 'blue' tag, and, A3 with 0 CPUs available. Cluster B 504*b* contains 3 nodes; B1 with 2 CPUs available, B2 with 2 CPUs available, and B3 with 1 CPU available. Cluster C 504*c* contains 3 nodes; C1 with 2 CPUs available; C2 with 2 CPU available, 'red' tag, and C3 with 1 CPU available.

Figure 6:
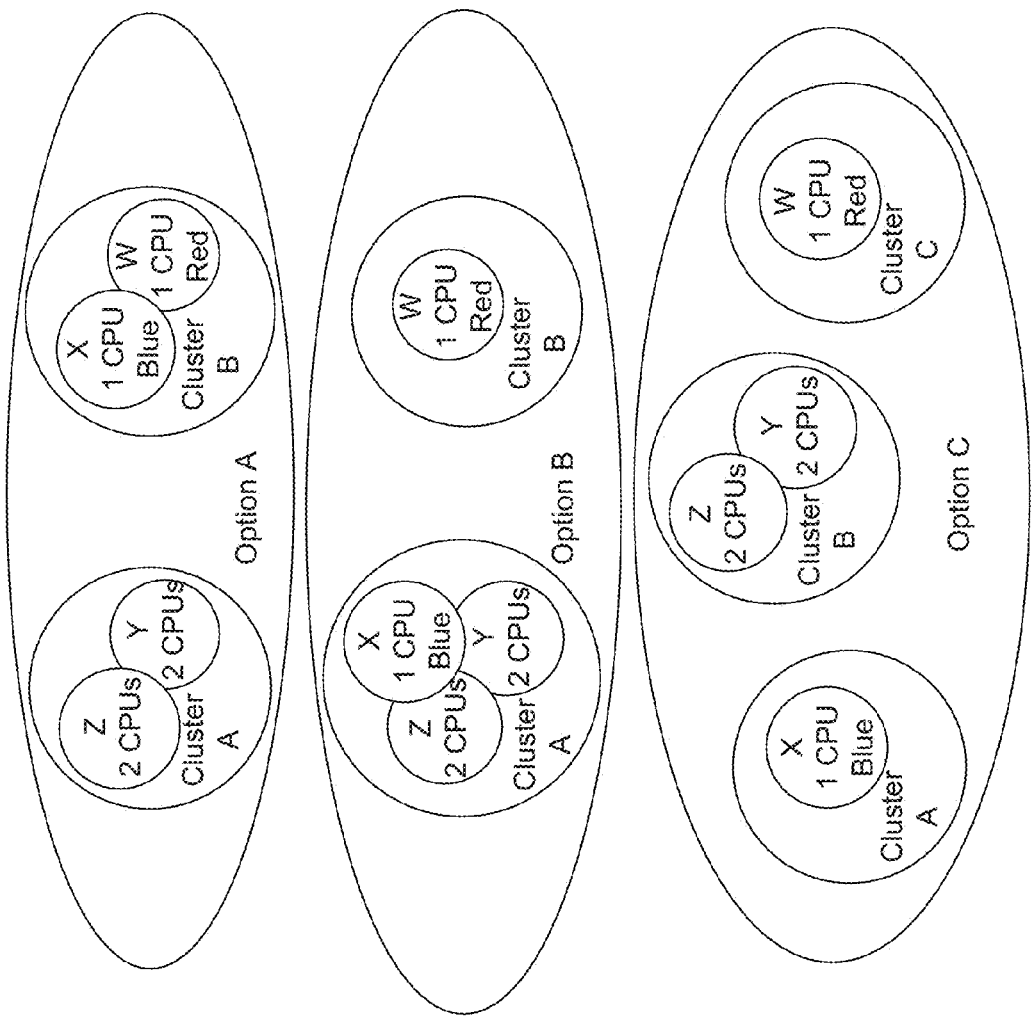
FIG. 6 is a schematic illustrating placement, according to some embodiments.

The launch plan 520 entered requests for 4 instances, with size, tag, and relationship constraints specified, as illustrated. Using these constraints, possible placement situations are generated, as illustrated in FIG. 6.

Option A: Assigning instances Z and Y in Cluster A; and instances X with Blue tag and W with Red tag in Cluster B.

Option B: Assigning instances X, Z, and Y in Cluster A; and instance W with Red tag in Cluster B.

Option C: Assigning instance X with Blue tag in Cluster A; instances Z and Y in Cluster B; and assigning instance W with Red tag in Cluster C.

These are then compared to the site 502 as it stands to determine whether they are feasible. Option A fails as there does not exist a cluster which contains both a "Blue"-tagged node, and a "Red"-tagged node. Option B fails as there does not exist a cluster with two 2-cpu slots and a 1-cpu slot which is "Blue"-tagged. Option C is feasible on the site, and is implemented.

Figure 7:
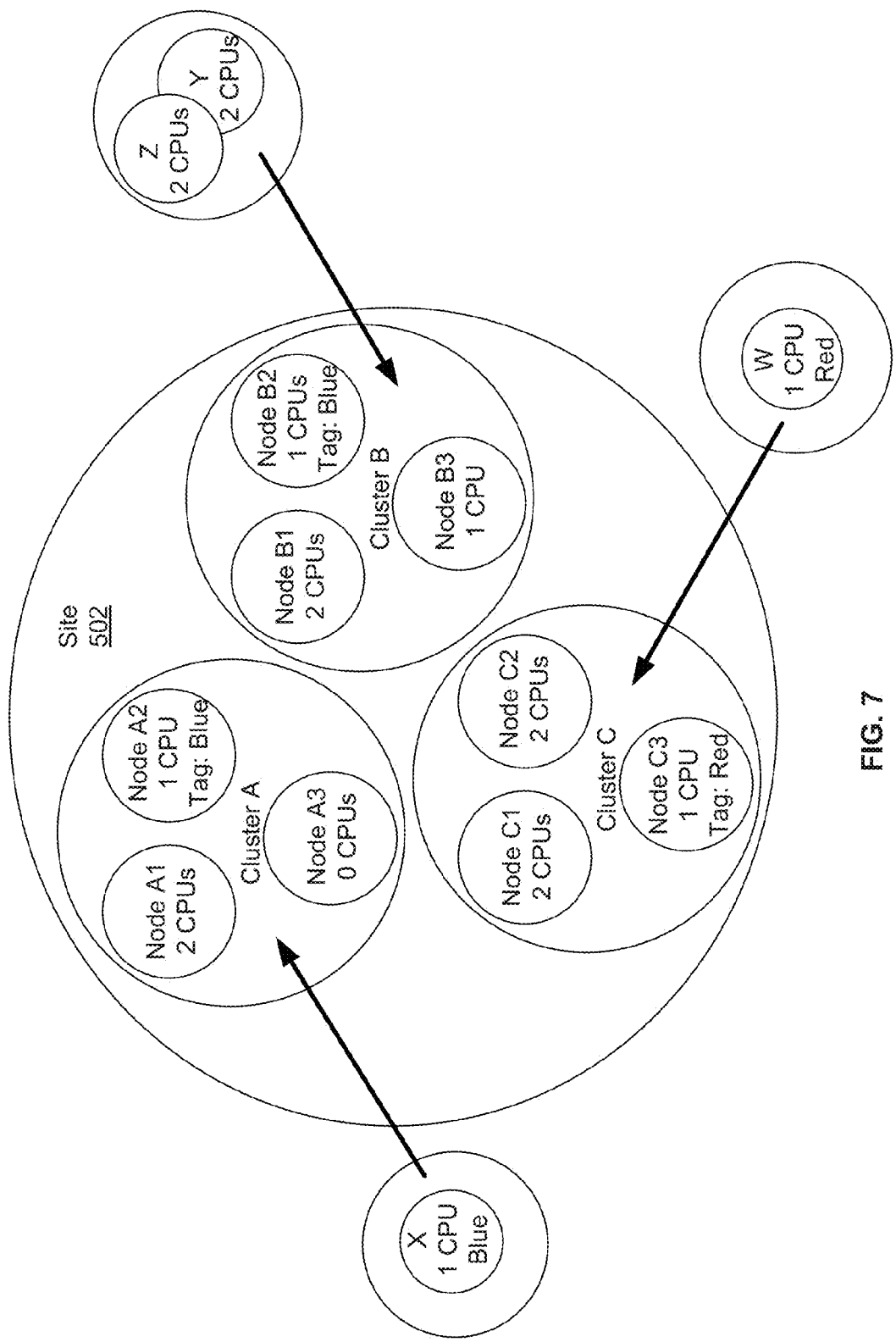
FIG. 7 is a schematic illustrating a final placement, according to some embodiments.

FIG. 7 illustrates the implementation of Option C in the final placement of the launch plan to the site 502.

(b) Authentication & Permissions

Users of the system 100 are authenticated by password or some other credential confirming their identity. Authentication is performed to ensure that the users requesting services from the system 100 are in fact the users they claim to be. Once users are authenticated, individual requests are further checked to ensure that the specific user making the request has the required permissions to perform the action request on the object on which the action is to be performed.

(i) Authentication

In the system 100, most requests require that the user be authenticated. Authentication is done by performing an authentication request. This returns an authentication token if successful. This token is then included in all other requests as proof of authentication, and may be updated in response to any request.

(1) Internal Authentication

Figure 8A:
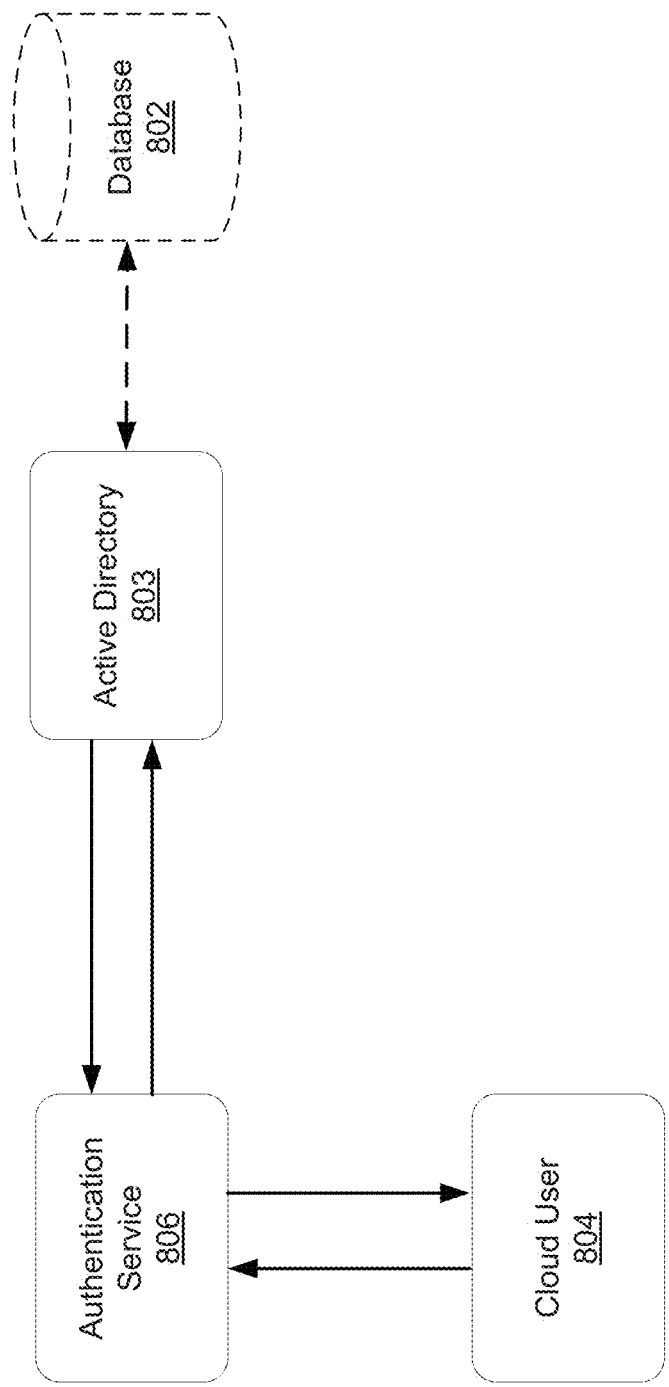
FIGS. 8A and 8B are block diagrams illustrating two different authentication processes, according to some embodiments.

FIG. 8A illustrates a basic authentication service 806 for authenticating a user 804 for access to a cloud environment 144. Each cloud user 804 may access a local cloud authentication service 806 before the user 804 is allowed access to any of the cloud system services, such as system 100. Communication may occur over an SSL channel, TLS channel or other secure encryption protocol. The user 804 contacts the authentication service 806 to request authentication as an authorized user. In the simplest case, the user 804 is known to the authentication service 806 and the service responds directly. The user 804 logs in to the authentication service 806, and verifies access to the authentication server 806 by submitting a set of credentials known to the user, such as a password. In some situations, authentication server 806 may use alternative methods to a password for authenticating users 804. Since the user 804 is known to the authentication service 806, the authentication service 806 issues a confirmation indicating the user 804 has been authenticated. The confirmation may be an accepted ticket in the form of a token (e.g., a cookie) that follows the transactions of the user 804 during the current login session.

In some embodiments, the authentication service 806 may consult another authentication service such as active directory 803, to authenticate users against some existing user databases. In some situations, the active directory 803 is an integral component of the authentication service 806, and in other embodiments the active directory 803 is a separate directory and/or database 802.

(2) External Authentication

Figure 8B:
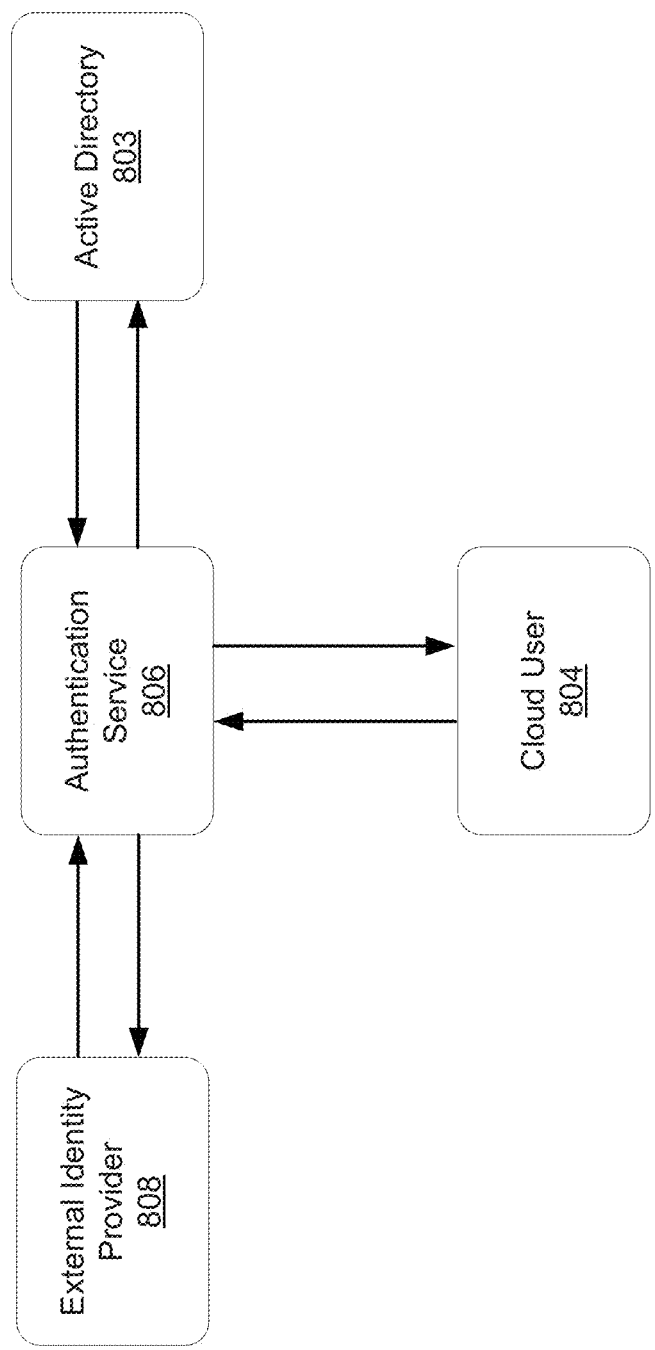

FIG. 8B is an illustration of an authentication process that relies on an external identity provider 808 according to some embodiments. External authentication is also an important feature of the cloud management system 100.

In some situations, authentication of a user 804 may be made by an external identity provider 808. The external identity provider 808 may operate in a fashion similar to the process described above except that the authentication service 806 consults the external identity provider 808 to authenticate the user's 804 credentials instead of the active directory 803. For example, the authentication service 806 may consult the active directory 803 for one category of users from one cloud system, but may rely on the external identity provider 808 for another category of users from a different cloud system. The resulting token provided by the identity provider 808 can be submitted with requests to any site (cloud), which may then choose to honor or reject the request based on knowledge of the identity provider and the credentials encoded in the token.

(ii) Permissions

A customer that uses this cloud management system 100, may grant permission to users and groups to access services within the customer's "cloud." A permission is a delegation of privileges and/or a delegation of authority by an entity with granting authority within the customer cloud account. Users and groups are delegated a subset of the privileges available to the administrators of the customer, who are granted the full set of customer privileges at customer creation time. Groups are defined as a subset of users.

Figure 9B:
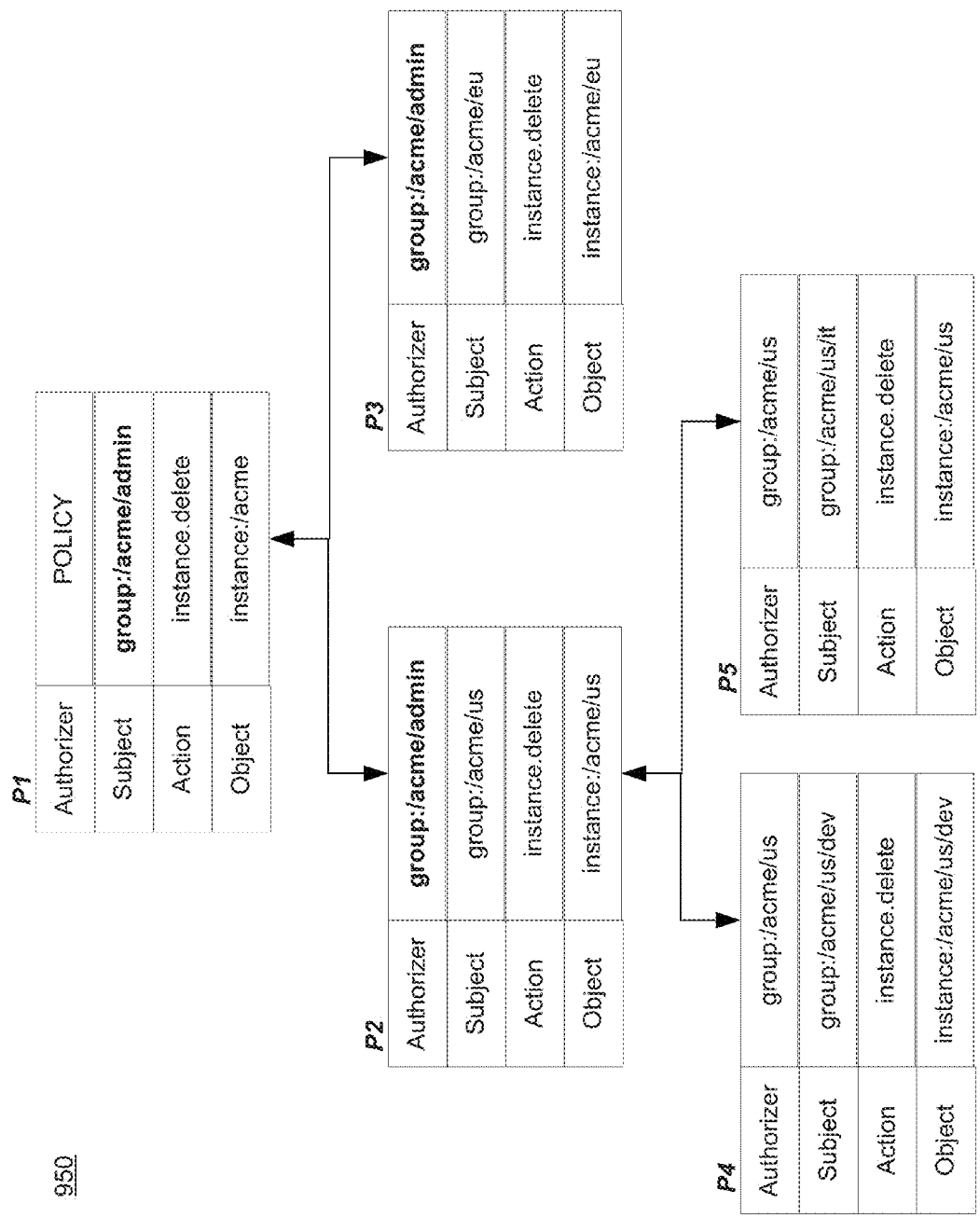

Permissions may be defined in any number of ways. FIG. 9A is a permission data structure 902 according to some embodiments. In some situations, a permission 902 may be defined by key 904, value 906 pairs that describe a delegation of privileges. For illustration purposes only, the key 904 in the example provided may have the following values:

authorizer—the value indicating who is delegating the permissions;

subject—the value indicting to whom the permission is being delegated;

object—the value indicating on which object an action is authorized;

action—the action that is being authorized

The permission is therefore an assertion that the subject may perform a specified action, given that the authorizer is permitted to perform the same action.

The example permission 902 authorizes members of the group group: acme/us/dev to add a Launch Plan to the system (launch instances) under the restriction that the group group:/acme/admin is able to delegate these privileges. The group group:/acme/admin is able to delegate these privileges if the group is authorized to perform the action Launch Plan.add on the object Launch Plan:/acme/dev.

A system policy is a set of initial permissions granted at customer creation. These permissions are known as policy assertions and are indicated by an authorizer set to 'POLICY'.

In some embodiments, permissions are divided into two types: object permissions and user permissions. Object permissions are permissions that the owner of an object creates to describe what actions may be performed and by whom on the object. These object specific privileges may be delegated by authorized users. User permissions are permissions that are created to describe what actions may be performed by users (or a subset of users) that belong to a particular customer. These user specific privileges may be delegated by authorized users.

The set of all object permissions describes a directed graph 950 where each permission P1-P5 is a vertex in the graph. Each permission, for example P1, is connected by a directed edge to other permissions, e.g., P2-P5, where the authorizer of the permission P2 is compatible with the subject of the permission P1, and the action as well as the object in the permissions are also compatible. An authorizer, e.g., of permission P2 and subject, e.g., of permission P1, are compatible if they have the same value, or if the authorizer is a descendant of the subject in the naming hierarchy. Two objects are compatible if the object specified, for example in permission P2, is the same as, or a descendant of the object specified, for example in permission P1. Two actions are compatible if the action specified in, for example permission P1, is unspecified (not shown), or the same as the action specified, for example in permission P2.

To actually perform an action on an object, a delegation path should exist within the object permissions for the action being performed. In addition, a delegation path should exist within the user permissions for the action to be performed. A delegation path exists if there is a path in the directed graph 9B from a permission with authorizer 'POLICY' to a permission for which the user (requester) or groups that the user belongs to is the same as, or a descendant of the subject specified in the permission;
    the object on which the action to be performed is the same as, or a descendant of the object specified in the permission; and/or
    the action in the permission is unspecified, or the same as the action requested.

A customer may thus grant or limit groups within the organization to access objects and to actually perform actions on objects.

(1) Permissions Management

A 'permissions management system' determines whether a set of credentials prove that a request may be granted according to system policies and assertions. The request is a list of key value-pairs that describe an action that a requester/user is hoping to perform.

In some embodiments, 'policy' is system-local to the customer account that controls access, whereas the requester may be remote to this system, and hence the credentials would need to be communicated over possibly insecure links.

(2) Hierarchical Naming Structure

In general, the naming structure for all entities follows a hierarchical structure: /group/subgroup/subgroup. Based on the hierarchy of this structure, permissions are inherited down the hierarchy (e.g., any permission given to group a/b is also applicable to members of a/b/c), as described in further detail below.

In addition to permission inheritance, the hierarchy also provides a mechanism to partition the namespace such that x/bob is not the same as y/bob.

In some situations, the naming structure implicitly describes a privilege inheritance structure. Thus the group group:/acme/it/maintenance automatically inherits the set of all the privileges of group:/acme/it, to which additional maintenance-related privileges may be added. All sub paths of the group:/acme/it will also inherit these privileges. If the inheritance of privileges is not desirable, the group structure may be reorganized and subgroups may be avoided.

In some embodiments, to allow resources to be identified correctly on any site, the naming scheme may be extended to include details about the site itself. One may either use a URL to explicitly name the external site, or the hierarchical naming scheme may be used together with a site name. The site name also allows the permission system to identify the permissions that are applicable to a specific request.

A three part naming scheme with an optional site name (in the case of objects or object permissions), or idp name (in the case of users or user permissions) may be used so that a subject or authorizer in a permission can have the form:
    type:/base_entity/resource_path@idp
    Objects have the form:
    type:/base_entity/resource_path@site In this case, 'type:/base_entity/resource_path' refers to only resources on the site at which the permissions are added. This is equivalent to 'type:/base_entity/resource_path@local site (or IDP)'. The 'base_entity' here is an arbitrary path, and serves to illustrate that arbitrary hierarchical path names are supported. The form 'type:/@site' would refer to any resource of the required type at a particular site. The form, 'type:/base_entity/resource_path@' (site name omitted) refers to any site.

(3) Applicability to the Group Structure

The users are the requesters. The requests seek authorization to perform an action on an object. For example, "can I execute image x?", or "can I add a user to group B?", or "can I create a new group as a subgroup of G?", and so on.

The policies that determine whether a user has the right to an action is controlled and managed by the groups in the User Group hierarchy to which users belong, and these policies are ultimately set by the system administrators of the organizations at the root of the user's User Group hierarchy. Of course some aspects of the policy may be delegated to users lower in the hierarchy. This means that, in general, the principles (authorizers and subjects) in policy assertions will be User Group names.

On the other hand, there is also policy that is issued by the users that control the objects on which the requester wants to perform the action. For example, "can I execute image x", even if allowed by the organization's policy, may not be allowed by the owner of the image. The owner should issue assertions that allow the action. In the case of 'user groups,' and the management of users in groups, the user group hierarchy is also used to manage object policy. So, user groups perform two functions: they allow management of policy on users—membership of a particular group infers some policy on a user, and they allow allocation of policy to the actual group object.

Although assertions described thus far are local to the system 100, in some embodiments assertions may be created and communicated outside the system. In this case assertions could be signed to become credentials (a credential being a signed assertion), allowing such communications of assertions to be secured. Nothing in this structure prevents that.

In some situations, a company could outsource the management of its groups to some outside service provider. This is done by providing policies that delegate management actions on its groups to the outside service provider.

(iii) Authorization

Authorization is the process of establishing whether a given set of permissions allow a user to perform an action on an object. The authorization system supports an environment where customers may collaborate to achieve some goal. In a collaborative venture between two customers, two parties are required to provide permission to perform any particular action (each action will be performed on some object): the owner of the object should permit the action, and the customer that the user performing the action belongs to should approve the action.

Thus, the authorization system decides what actions requested by users of the system may be performed, based on the stored permissions. Each action should be authorized by two parties, for example the owner of the object, and the customer of the user.

Requests have two key, value pairs: the action that the user wants to perform and the object on which the action is requested. Requests may be authorized by action authorizers, the groups to which the user that wants to perform the action belongs. Requests usually have two key value-pairs, viz (a) the action that the user wants to perform and (b) the object on which the action is requested. For example, a request may have the following key and value pairs:

Example 1 action=machineimage.get
object=image:/ubuntu/beta/absurdanimal

Example 2 action=group.add
object=group:/largeco/accounting

In the first example, the action is to retrieve an uploaded image for execution. In the second example, the action is to add a new group to the already existing "accounting" group of customer "largeco." Each object is prefixed by a type that separates the User, Group, Image List and other namespaces. There are different types/levels of authentication.

(1) Simple Authorization

Figure 9C:
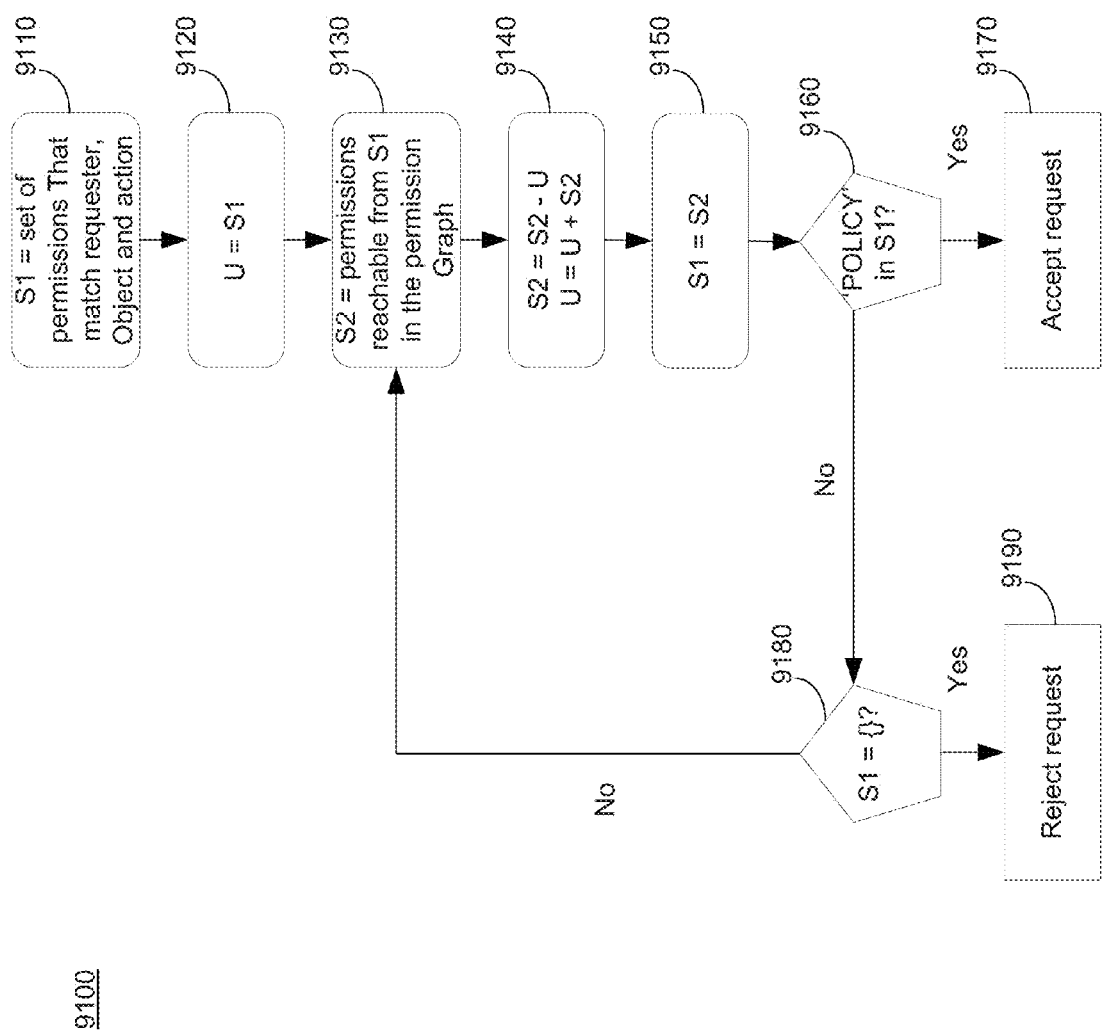

A simple authorization process may be described as a graph traversal 9100 in FIG. 9C. At step 9110, a set S1 of all permissions compatible with the request is located, where the subject of the permission is compatible with the requester. A permission is compatible with the request if the object is compatible with the requested object, and the action is compatible with the requested action. At step 9120 the set of visited permissions U is set to be equal to the set of permissions S1. At step 9130, for each permission in S1, follow the edges in the graph to related permissions. S2 is this set of related permissions at step 9140. Further at step 9140, the set of already visited permissions U are removed from the set S2, and the resulting set of permissions in set S2 are added to the set U (in that order). The '−' and '+' operations at step 9140 refer to set difference and set union respectively.

At step 9150, set S1 now contains only the permissions that are in set S2. Steps 9130 to 9150 are repeated until a policy assertion (authorizer='POLICY') is a member of S1 (at step 9160), or S1 is the empty set (at step 9180.) In some embodiments, the graph traversal algorithm ensures that S1 contains a policy assertion or is empty after a finite number of steps. If S1 is the empty set at step 9180, then return a "reject request" at step 9190. If a policy assertion is a member of S1 at step 9160, then return an "accept request" at step 9170.

The graph traversal algorithm 9100 must be executed separately for both the object permissions and the user permissions. If both graph traversals accept the request, then the request is authorized. Otherwise the request is not authorized.

(2) Authorization for the External Cloud

Figure 10A:
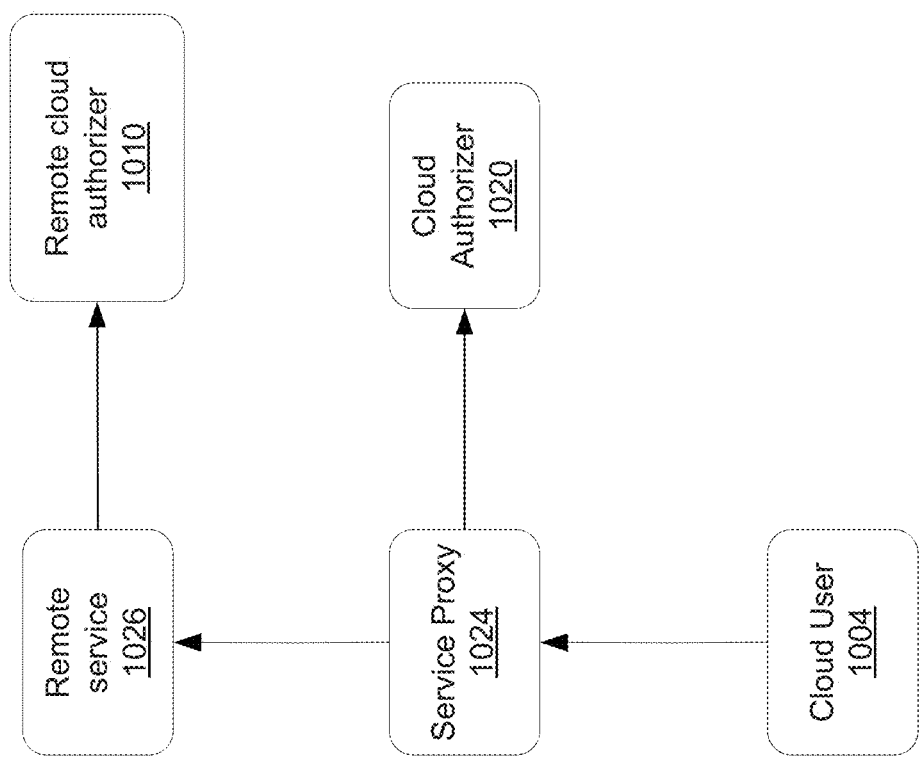
FIG. 10A is a flow diagram illustrating an authorization process, according to some other embodiments.

FIG. 10A illustrates an authorization process in a federation, according to some embodiments. In other words, how a user 1004 can obtain a permission for a resource outside of the user's preferred or "usual" cloud.

The user 1004 contacts a service proxy 1024 which will forward the request to a remote site (not shown). The service proxy 1024 confirms that the user 1004 may perform the action based on User Permissions specified in the system, and forwards the request to a remote service 1026 if the user 1004 is authorized to do so by the cloud authorizer 1020. The cloud authorizer 1020 consults the User Permissions to determine if the request may be permitted. The remote service 1026 will execute the request if the remote cloud authorizer 1020 determines that request is authorized based on the Object Permission specified at the remote cloud (not shown).

(3) Federation Token Service

Figure 10B:
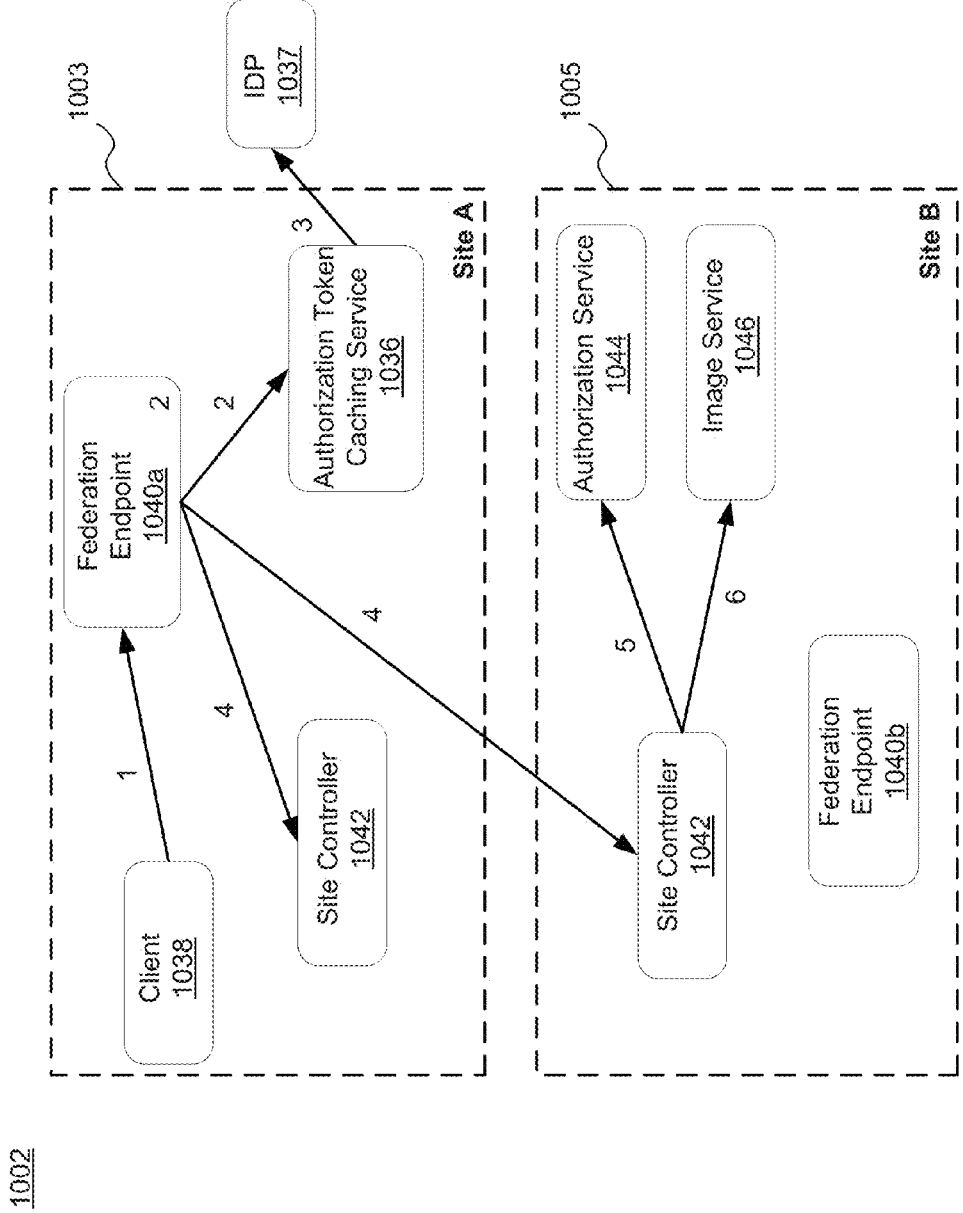
FIG. 10B is a flow diagram illustrating a federation token service, according to some embodiments.

FIG. 10B is a flow diagram that illustrates authorizations utilizing a token service in a federation, according to some embodiments. FIG. 10B describes a token service providing services to at least two cloud sites Site A 1003 and Site B 1005. FIG. 10B may include the process of FIG. 10A, but in more detail. To allow partially independent interpretation of requests, services should be able to determine if a request is authorized without inspecting user permissions, since user permissions will be granted at the identity provider for the user making the request.

Object permissions related to the resources to be used may be available on the site at which the request is made, and thus any service can determine, based on object permissions, whether the request is permitted or not.

Thus, each service will only authorize requests based on available site object permissions, and the user-side of the authorization is based on the authorization token submitted with the request. However, to relieve every client making requests of the system from retrieving authorization tokens containing authorization information from the Identity Provider 808 (where the user permissions are kept), this service may be performed at each site by a token fetching service, as part of the federation system.

In some embodiments, the tokens containing the authorization credentials may be constructed according to Security Assertion Markup Language (SAML) standard.

In some embodiments, to further avoid client complexity for any clients 1038 making requests of the system, services can contact a local credential caching service 1036 to obtain the authorization tokens required for a request in an authorization. The caching service 1036 can be responsible for storing appropriate authorization tokens (e.g., retrieved from the identity provider 808) for the duration that these tokens are valid for.

Each service should only authorize requests based on available site object permissions, and the rest of the authorization is based on the authorization token submitted with the request. However, since the client will not be retrieving its own authorization token, there needs to be a front end that will accept requests, acquire the necessary authorization tokens, and make the request at the required sites on the clients 1038 behalf. This may be accomplished within a federation system or a federation proxy.

For example, consider the case of launching instances with respect to FIG. 10B. A launch plan specifies instances in multiple sites, with multiple machine images, and image lists involved:

The basic flow of information, shown in FIG. 10B is as follows:

At process 1, client 1036 submits the appropriate launch plan to a federation service 1002.

At process 2, a federation endpoint 1040*a* determines the user permissions that will be required for each site 1003, 1005 that will be contacted, and contacts the authorization caching service 1036 to obtain an authorization token for each of the identified actions. This process may occur at any site in the federation system 1002, such as at federation endpoint 1040*b* at Site B 1005.

At process 3, the authorization cache service 1036 contacts an identity provider (IDP) 1037 (which may be locally or remotely located) on behalf of the client 1038 (e.g., submits the client authentication token) to obtain the authorization token, or retrieves a valid authorization token from a local store (not shown).

At process 4, the federation endpoint 1040 forwards the request (splitting up launch plans as required) to the identified target sites (as identified in the request). Note that the endpoint should not be a federation endpoint, since we don't need new authorization tokens to be generated. So the request must either indicate that authorization tokens have been obtained, or a different endpoint should be contacted which does not obtain authorization tokens.

At process 5, the target site, via site controller 1042 accepts the request, and validates the authorization tokens and authentication token at authorization service 1044. The target site controller 1042 may reside locally at Site A 1003 or at a remote site Site B 1005.

At process 6, various services, such as authorization service 1044 or image service 1046 in Site B 1005 may be locally provided. For example, object permissions may be checked at authorization service 1044 of Site B 1005 locally to determine if the request will be permitted. Site B 1005 may also include image service 1046, which the site controller 1042 accesses locally to manage image lists and machine images. It will be appreciated, however, that the site controller 1042 on Site B may access image lists, authorization services or other services that may reside at other sites (e.g., Site A 1003) or at remote service locations, (e.g., IDP 1037 if it is accessed remotely from Site A 1003 or Site B 1005).

In some embodiments, authentication and authorization tokens may contain both the user name, as well as name of the identity provider 1037. Each site 1003, 1005 contains a list of known sites and encryption keys that can be used to validate the tokens. Authentication tokens are verified by validating the signature. The group membership of the user may also be required in the authentication token. This information may be required so that the group information is available for object permission checks.

The signature on an authorization token is also validated. In addition, the applicability of the authorization token must be determined to confirm that the provided authorization is applicable to the requested operation.

In some embodiments, after the authorization token has been checked, the object permissions for the site will be checked.

(c) Monitoring

The cloud management system 100 of FIG. 1 provides mechanisms to gather data on the resource utilization and health of the system as a whole, and the performance of all nodes 114 in particular, to provide operators of the system insight into the health of all nodes and the system.

A monitoring agent of the monitoring component 124 of FIG. 1 gathers data on each of the nodes 114 on a variety of aspects, including but not limited to CPU utilization; memory utilization; network utilization; and the number of instances active on the node. The data gathered on the nodes is transmitted to a cluster-wide aggregator for storage at, for example storage 134. The cluster-wide aggregators are redundant, with a master and secondary node operating to ensure continued operation in the case of failure of either the master or secondary. Each cluster controller 324 transmits summary data from the aggregated node data to the site-wide controller 326, where the data is further aggregated and stored. The site-wide aggregator is also redundant with a master and secondary. A web-based console provides a visualization of this data to aid in troubleshooting and investigation of the operation of the system 100 as a whole.

Some key features of the monitoring agent includes, but are not limited to, the following:

Responsive—The availability of monitoring data should be adequately fast.

Scalable—The overheads incurred for monitoring should not grow unreasonably as the size of the network grows.

Robust—Monitoring should not be adversely impacted by the failure of a node or its aggregation node and if an aggregation node fails a new aggregation node should be nominated efficiently.

Network typology agnostic—Different networks topologies should be supported including the use of NATs, firewalls, and so on.

Support for heterogeneous systems—Monitoring must be possible across different hardware configurations.

Minimal communication overhead—The overhead incurred to disseminate monitoring data should not adversely affect user or system communications across the network.

Minimal local resource usage—The local resources necessary to monitor, disseminate and store data should be low. This includes local CPU cycles, memory and disk storage.

Secure—Nodes should not be able interfere with the monitoring of peer nodes. Requests to monitor specific resources should be authorized.

(d) Metering & Billing

The cloud management system 100 of FIG. 1 additionally provides a mechanism to enable multi-party billing of usage of the cloud infrastructure. This mechanism addresses the usage charge-back problem when an enterprise needs to "charge back" the usage of infrastructure to the various groups or departments that used it. Thus the system 100 provides mechanisms to bill metered and rated usage to consumers (customers) of the system 100 via metering & billing component 126. In many cases, and especially for service providers using the system 100, there may be multiple parties that share in the revenue generated. For example, the service provider itself, software vendors that add functionality to the infrastructure, connectivity providers, and so on. The system 100 provides the mechanisms to calculate and divide up the revenue stream generated amongst the parties that should share in it, which are defined by the metering & billing component 126.

The system therefore accumulates metrics and/or billing on several metrics, including but not limited to:

Compute resources used on a per time basis (e.g. CPU usage/hour).

Read and Write I/O operations ("IOPs")

Network bandwidth used.

In general, metering can be done at one or more of the API 106; the compute nodes 114; and/or at the storage backend 128, 134.

Figure 11:
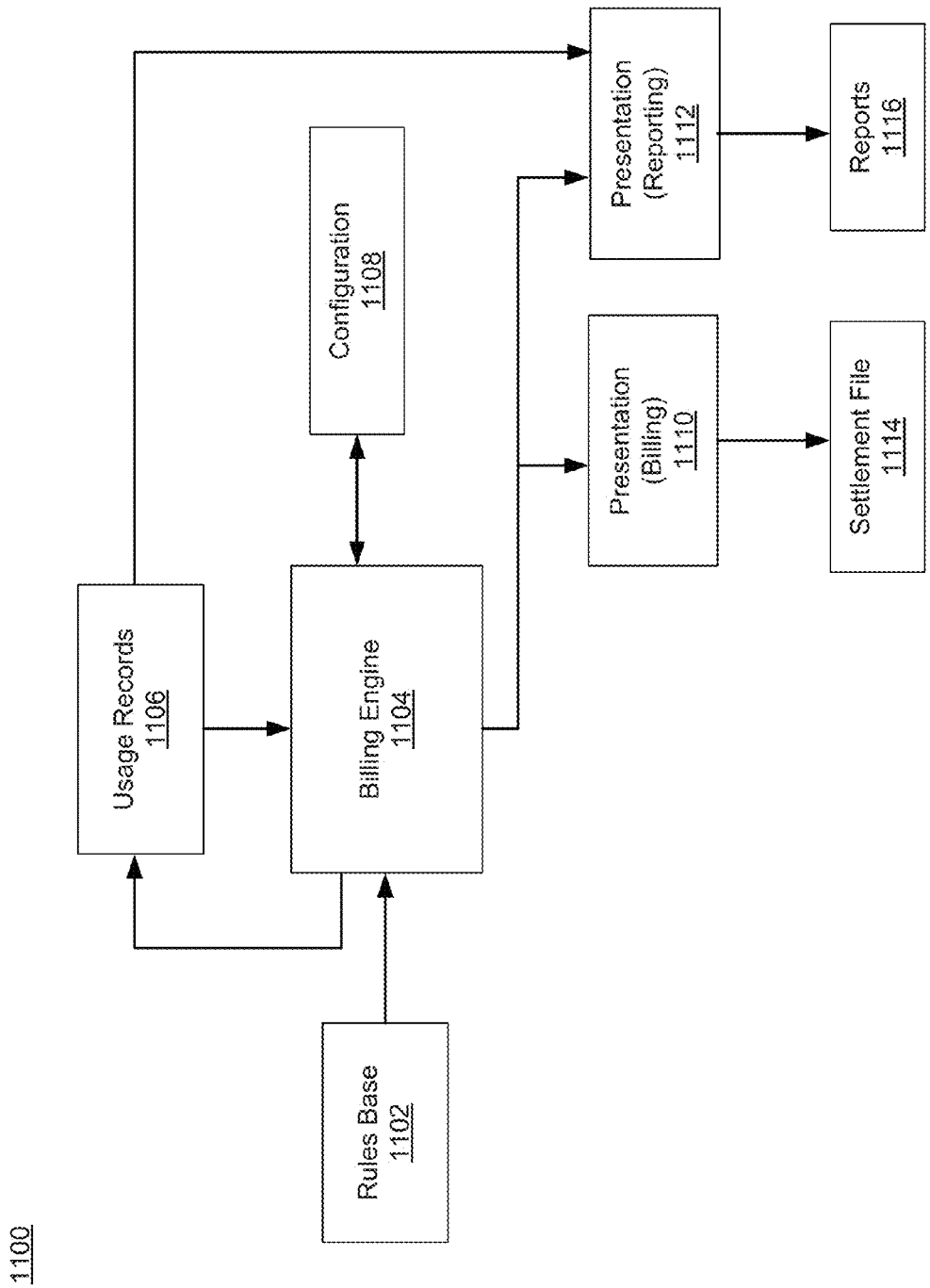
FIG. 11 is a block diagram illustrating a billing system, according to some embodiments.

Metering and billing are considered in further detail below with reference to FIG. 11. The metering and billing engine 1100 comprises a billing engine 1104 that is driven by a rules base 1102. The billing engine 1104 interprets the rules within the context of a set of configuration 1108 that is supplied to it, and modifies the configuration and the usage record file, e.g., usage records 1106. A subsequent presentation layer 1110, 1112 produces payment file(s) from the modified configuration, and reports 1116 from the modified usage records 1106.

The usage records 1106 are a set of entries that record the consumption of resources. The order of the records 1106 is not important, except that order must be preserved over the life of the file. Typically the order will be chronological based on the time of the metered consumption. Other means of organizing usage records 1106 may be implemented.

Each record in the file 1106 is a set of <tag, value> pairs. No specification is made on the tags that must be present, and no requirement of uniqueness exists for the transactions. XML may be an appropriate structure for this file, possibly stored in DFS.

Configuration 1108 of the metering and billing system 1100 consists of two parts: configuration of the potential accounts involved in the system, and therefore in the settlement of the net values in a business period, and configuration of sets of entities for use in the settlement rules.

Account configuration minimally contains the following information:

| | |
|---|---|
| Name: | A name for the account, which is referenced by the rules. |
| Details: | Banking details of the account. |
| Business Cycle: | A specification of the business cycle of this account, which implies the frequency at which it will be settled. This is specified in number of business hours or days, with a vector which specifies excluded days (public holidays, etc.). |
| Debit value: | Current total of debits performed to the account in the current business cycle for the account. |
| Credit value: | Current total of credits performed to the account in the current business cycle for the account. |
| Historic debit and credit values: | Similar to the above, except that the historic totals for business cycle (current-1), (current-2), etc. are also stored. |

At the start of a business cycle the debit and credit values of the account are zeroed. As settlement rules are processed, values are accumulated into these accounts. At the end of a business cycle, the values are shifted into the historic values.

Finally, one of the configured accounts is designated as a clearing account against which all the debits and credits are performed when a settlement file 1114 is produced.

The rules base 1102 consists of a sequence of rules, each with the following elements:

| | |
|---|---|
| Name: | A name for the rule. |
| Predicates: | A sequence of predicates, all of which must be true for the rule to be executed. Each predicate is an expression that tests the value of a tag in a usage record. The expressions contain the normal operators =, !=, <, >, and NOT. In addition there is a set membership operator IN that tests whether the tag value is a member of a set (if the set is a set of tuples, the enum part of the tuple will be used for the membership test). Expressions may also refer to historic account values (debit or credit). The syntax is Name.debit[period], or Name.credit[period], where period is a (negative) offset from the current period. When the sequence of predicates all evaluate to true, the rule is said to fire, and a sequence of actions are performed. |
| Actions: | The sequence of actions that takes place once the predicates associated with the rule are all determined to be true. Each action to be performed has the following form: From account, To account, expression, tag Where the 'tag' is optional. The action indicates the value, as calculated by the expression, that must be moved from the From account to the To account . . . The tag has an explanatory purpose and serves to record the reason for the movement of funds in later reporting. |

The associated (optional) tag name and To account combination must be unique across all rules.

To shorten the number of rules, configured tuple sets may be used to specify Meta rules where the value of a tag in a transaction identifies that account to use. In this case the enum element of a tuple must match the value of a tag, and the value part of the tuple specifies the name of an account. The notation used (for explanation here) is of the form: SetName[tag].

When a rule fires, a series of actions occur:

The debit value of the "From account," and the credit value of the "To account" are both incremented with the value indicated by the expression.

From account or To account, as appropriate, is tagged with the tag.

The value of the expression is associated with the tag (note that a single account may accumulate several tags). If the tag is already present on the account, then the expression value is accumulated into the tag, providing a total value of funds associated with that tag. If every line of every rule contains a tag, then the sum of values of the tags associated with an account will always be the same as the account's, thereby providing a breakdown of the account value by tag. This provides a mechanism to categorize value, and to record the reasons for fund movements.

Finally, the tag is also appended to the transaction in the transaction file, with the value of the expression as its value. If the tag already exists in that transaction, an error is flagged.

The billing engine 1104 runs through the entire usage file. For each transaction in the file, the following actions are taken:

For every rule the predicates are evaluated, and the transaction is checked to ensure that the rule has not yet fired for this transaction.

If the predicates are all TRUE, and the rule is new to the transaction, then the actions associated with the rule are performed (all the account values are incremented as described above, and all the tags are added).

When all the actions have been executed, the transaction is tagged with the rule name, so that future evaluations of this transaction will not re-fire the same rule.

At any time after the billing engine 1104 has processed a sequence of rules the values of accounts will have been affected by the various increments of debits and credits. A settlement file 1114 may be produced by netting these against each other for each account, and by providing a list of payments. Such payments are typically recorded against the clearing account, either a movement from an account to the clearing account, or vice versa. The settlement file 1114 may be produced in a format suitable to be submitted to an automated clearing house (ACH) facility, or to an organizations internal accounting systems.

Each account will have a sequence of tags and values associated with it at the end of every settlement run. The tags provide a detailed breakdown of the value for the account. This allows at least two key reports 1116 to be produced, for illustration purposes:

A payment report by account (both debit and credit, or consolidated), with a columnar breakdown of the total in the account, as follows:

Account Debit Credit Total Tag1 Tag2 Tag3 . . .

Since each transaction is also tagged with a sequence of tags, every entry in the above report that contains a non-zero value under a tag name will represent one or more transactions for which values were accumulated into the tag associated with the account. Listing all transactions that contain a matching tag name will list all transaction processed to produce this value. The rules executed may also be listed for each.

(i) Billing Use Cases

In an example of cloud computing organization that utilizes cloud management system 100 of FIG. 1, the organization uses the cloud management system 100 to provide virtual desktops and virtual servers to the various regions, departments and employees of the organization. Each department has different servers and desktop needs, and requires machine images that fulfill these needs. Machine images are created by the organization's technical staff but are launched by employees within a department. Every employee has a private data store that can be accessed from a launched desktop image. Every department has several general data stores that can be shared intra or inter departmentally.

The organization accounts for infrastructure usage based on the physical hardware used to host an image and external traffic to and from an image. Usage is accounted for at the regional, departmental and employee levels. Departmental usage is determined by the sum of all the department's employees usage as well department server usage. Regional usage is determined by summing departmental usage but only for employees and servers belonging to that region.

A business may desire to provide cloud services for utility computing. Clients must register in order to create or launch images or to store data in the cloud computing system. Clients are billed based on images they have launched and bandwidth to and from the launched images. The business may also want to track overhead resource usage.

(ii) Billing Example

In this example a service provider is using the cloud management system to provide infrastructure services to two clients, client1 and client2. According to the pricing of the system, the clients will be charged as follows:

Each byte of out data is billed at 0.8 except if the user is system

Each byte of in data is billed at 0.1 except if the user is system

Revenue from the provision of these services is shared amongst three vendors involved in providing the service, vendorA, vendorB and vendorC. According to their agreements, the revenue will be shared in the following manner:

60% of all in/out data revenue goes to vendorA

40% of all out data revenue goes to vendorB

40% of all in data revenue goes to vendorC

Metrics are sampled and then written to a large data store. Each metered value is stored as a (metric, value) tuple and associated with a user identifier and a timestamp. In tabular form, the data may be organized in the following manner:

| user | timestamp | metric | value |
|---|---|---|---|
| client1 | 2010-06-02 14:23:32.100 | bytes_out | 20 |
| client1 | 2010-06-02 14:23:42.100 | bytes_out | 48 |
| client1 | 2010-06-02 14:23:47.100 | bytes_in | 48 |
| client2 | 2010-06-02 14:23:47.100 | bytes_in | 32 |
| client2 | 2010-06-02 14:23:52.100 | bytes_out | 96 |
| client1 | 2010-06-02 14:23:52.100 | bytes_out | 22 |
| system | 2010-06-02 14:23:52.100 | bytes_out | 22 |

Accordingly, predicate rules may be defined to match a cell in the metric data and then apply a rating expression to the metered value. A cell may be identified by the user and metric columns (which can be indexed in the database).

Predicate rules fulfilling the above requirements are:

| predicate | fromAccount | toAccount | expression | outtag |
|---|---|---|---|---|
| metric == bytes_out, user IN clientlist | user | vendorA | 0.6 * value * 0.8 | vendorA_bytes_out |
| metric == bytes_out, user IN clientlist | user | vendorB | 0.4 * value * 0.8 | vendorB_bytes_out |
| metric == bytes_in, user IN clientlist | user | vendorA | 0.6 * value * 0.1 | vendorA_bytes_in |
| metric == bytes_in, user IN clientlist | user | vendorC | 0.4 * value * 0.1 | vendorC_bytes_in | where clientlist=set(client1, client2)

After the expressions are evaluated the resulting value is debited against the "from" account, credited against the "to" account and value tagged in the record. This is repeated for all matching rules.

Subsequently, accounts would then reflect:

| Account | debit | credit | vendorA bytes out | vendorA bytes in | vendorB bytes out | vendorC bytes in |
|---|---|---|---|---|---|---|
| vendorA | | 94.08 | 89.28 | 4.8 | | |
| vendorB | | 59.52 | | | 59.52 | |
| vendorC | | 3.2 | | | | 3.2 |
| client1 | 76.8 | | 43.2 | 2.88 | 28.8 | 1.92 |
| client2 | 80 | | 46.08 | 1.92 | 30.72 | 1.28 |
| system | | | | | | |

Metered data rows are also tagged.

Thus, the sample data would then reflect the following new columns:

| user | timestamp | metric | value | vendorA bytes out | vendorA bytes in | vendorB bytes out | vendorC bytes in |
|---|---|---|---|---|---|---|---|
| client1 | 2010-06-02 14:23:32.100 | bytes_out | 20 | 9.6 | | 6.4 | |
| client1 | 2010-06-02 14:23:42.100 | bytes_out | 48 | 23.04 | | 15.36 | |
| client1 | 2010-06-02 14:23:47.100 | bytes_in | 48 | | 2.88 | | 1.92 |
| client2 | 2010-06-02 14:23:47.100 | bytes_in | 32 | | 1.92 | | 1.28 |
| client2 | 2010-06-02 14:23:52.100 | bytes_out | 96 | 46.08 | | 30.72 | |
| client1 | 2010-06-02 14:23:52.100 | bytes_out | 22 | 10.56 | | 7.04 | |
| system | 2010-06-02 14:23:52.100 | bytes_out | 22 | | | | |

(e) Storage

The cloud computing infrastructure managed by the system 100 of FIG. 1 relies on disks for storage. Other storage means are also possible. As shown in FIG. 12 and analogous to the cluster and workload subcomponent 116, the storage subcomponent 132 includes a storage node controller 1222, a storage cluster controller 1224, and a storage site controller 1226. Each of these controllers is described further in detail.

Each backend storage appliance, e.g., at each node 1230, 1240 is managed by a software component, the storage node controller 1222, which incorporates a software driver appropriate for the specific type of storage appliance under management (e.g. a NetApp OnTap™ driver for NetApp storage appliances, an OpenFiler driver for OpenFiler storage appliances, etc). The storage node controller 1222 exposes a standard API for discovering and configuring the state of the underlying storage appliance, which translates these standard API calls into appliance-specific commands, which themselves are executed via the above-mentioned driver. In this way, the storage node controller 1222 exposes, for example, the list of volumes on the appliance, their size, performance characteristics and current utilization, to higher layers of control software (which are described below). Similarly, storage node controller 1222 exposes the ability to create, reconfigure, resize, back up/snapshot and destroy logical volumes on the underlying storage appliance.

Each storage node controller 1222 registers, at startup time, with the storage cluster controller 1224, which manages a fleet (or cluster) of such storage node controllers 1222. Each storage cluster controller 1224 may manage many (up to a few hundred, or even thousands) storage nodes 1230, 1240 comprising a plurality of storage clusters, e.g., storage cluster 1215, on behalf of which it exposes an API to discover the aggregate state of the cluster 1215, place new storage volumes on nodes 1230, 1240 in the cluster 1215, delete storage volumes in the cluster 1215, and perform other management operations as described above. As such, the storage cluster controller 1224 provides an index, mapping volumes onto individual storage nodes 1230, 1240 in that cluster 1215, and contains the logic for deciding which node to place new volumes on, based upon a variety of considerations including the desired size and performance characteristics of the volume, the historical and projected future utilization of storage nodes 1230, 1240, and other administrative requirements (e.g. to take a storage node 1230, 1240 out of service by draining volumes off that node before shutting it down).

All storage cluster controllers 1224 register with a redundant set of storage site controllers 1226 at startup time. The storage site controller 1226 exposes an API to the end users of the system via which storage volumes may be created, managed, monitored and destroyed, irrespective of where they reside. The storage site controller 1226 thus keeps track of the aggregate state of each storage cluster 1215 with respect to capacity and load, as well as a mapping from volume identifiers to storage clusters 1215. All API requests pertaining to existing volumes are thus mapped to the appropriate storage cluster 1215, to which the requests are delegated. Similarly, for API requests for creation of new volumes, the storage site controller 1226 decides which storage cluster 1215 to place the new volume on (based on a variety of factors including the aggregate utilization of the cluster 1215), and delegates the creation request to the appropriate storage cluster controller 1224.

Upon receiving a request to attach a volume to an instance, the site controller 326 in FIG. 3B consults the storage site controller 1226 to determine the network location and storage area network ("SAN") protocols (iSCSI, FibreChannel, GNBD, ATAoE, etc) supported by the volume. It adds this information to the request and delegates it down to the appropriate cluster controller 324 based upon it's internal mapping from instances to clusters. The cluster controller 324 similarly delegates the request down to the appropriate node controller 322 responsible for the node on which the instance is hosted. The node controller 322 is then responsible for creating a SAN attachment to the volume, and exposing this to the instance as a virtual block device.

Any number of configurations may be utilized to supply storage 134 for the system 100. The storage service 132 is generally configured, however, to address at least the following storage problems.

Compute nodes which fail may be quickly and easily replaced, with minimal fuss by the customer (e.g. no restore from backup).

Fast instance boot times are favorable.

The size, performance, and reliability of storage associated with any given instance should be flexible.

Spindles (or more specifically Input/Output Operations per Second (IOPs)) are in short supply, and should not be wasted.

The (virtual) disks exposed to instances should exhibit performance and failure characteristics similar to or better than standard commodity hard drives (because both people and software are familiar with those properties, and dramatic changes cause problems for both).

In the cloud computing system managed by the cloud management system 100, customers may create and destroy arbitrary numbers of simple block devices or storage volumes, each of an arbitrary size, and independent of any instance. Both pre-populated and empty virtual block devices may be utilized. The former may be pre-populated with machine images (by means of copy-on-write). So machine images are one type of block device. Once created, each device may be associated with one or more instances (either at instance creation time, or thereafter, and of course subject to an authorization model such as the one previously detailed.

Note that "no locking" is also possible, in which case customers may attach a block device to more than one instance. Customers may utilize a distributed lock manager, such as Redhat DLM, Oracle's OCFS2 Distributed Lock Manager, Apache/Hadoop Zookeeper or similar, to prevent conflicting reads/writes from/to the block device causing data corruption.

Networking

The cloud computing management system 100 provides networking functionality to enable different instances that have been launched by the system to communicate with one another and with the external world, whilst providing full policy control over which instances may communicate with which others, and which may communicate externally to the cloud. In addition, the system preserves full Layer 2 networking semantics, allowing instances to perform broadcast and multicast on the networks visible to them, again subject to policy control.

Figure 13A:
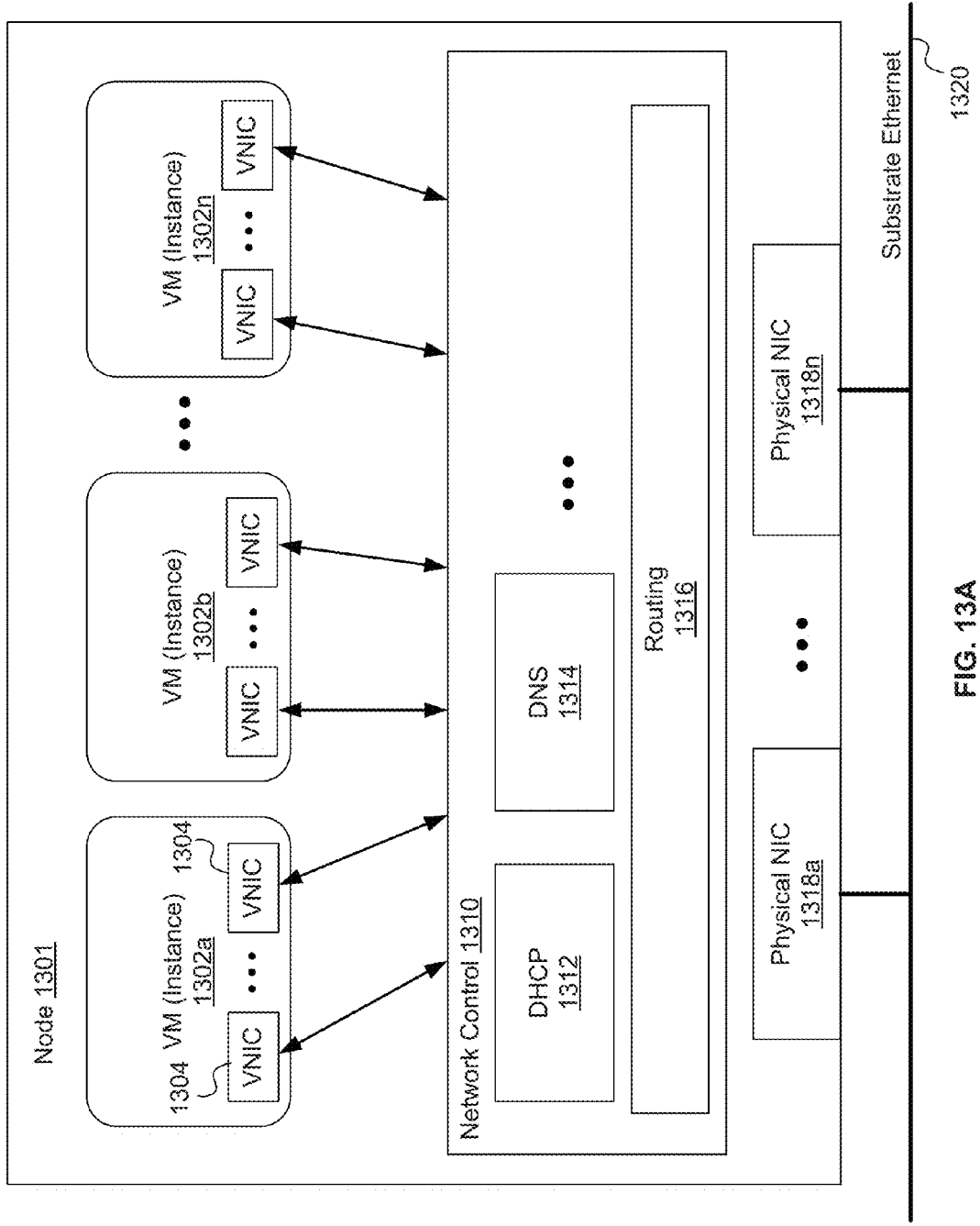
FIGS. 13A-13C are block diagrams illustrating examples of data transmissions on a network, according to some embodiments.

FIG. 13A provides a view of the network control component 140 of a single node 1301 in the system 1. The node 1301 includes a plurality of instances 1302a-1302n (also named Virtual Machines (VM)). Each instance may have an arbitrary set of virtual Ethernet interfaces ('VNICs') 1304 that may be specified at launch time, and added or removed thereafter (via hotplug or similar). Many instances 1302a-1302n will only have one VNIC 1304. VNICs 1304 are connected to a virtual interface, such as Virtual Machine Virtual Network Interfaces (VIFs) (not shown).

Each VNIC's 1304 traffic is sent via the networking control system running within the Host Operating System of the node 1301.

Virtual layer 2 networks ('vEthernets') may be created or deleted by customers as required (analogous to instantiating an Ethernet switch with an effectively infinite number of ports, and which effectively never fails). Many customers will only have a single vEthernet per site.

Each VNIC may be connected to one vEthernet (just like a physical NIC can connect to one switch), subject to administrative authorization, filtering and rate limiting policies (see more below).

All VNICs on a vEthernet behave just like physical interfaces connected to a physical Ethernet switch. In some embodiments, VNICs behave like physical interfaces with the exception that, due to load contention on the underlying physical network, latency and throughput on the vEthernet may vary over time (unlike on an uncontended physical Ethernet).

In some embodiments, VNICs see a single, flat layer 2 Ethernet network 1320, across which all other interfaces are addressable via their MAC addresses. Ethernet multicast and broadcast work as expected or known in the art, although variations may result for performance variations depending on the level of IP multicast support from the underlying physical substrate.

In some situations, virtual Layer 3 IP services may be added as required in the network control 1310. For example, a virtual DHCP server 1312, with associated address range allocation, may be instantiated on a vEthernet, and DHCP works as expected for all instances.

In some embodiments, a virtual DNS server 1314 provides local address resolution (which is dynamically coordinated with the virtual DHCP server 1312) and DNS recursion. Additionally, virtual gateways to other networks may be associated with a vEthernet to provide ingress and egress IP routing. Ingress is the traversal of a packet from the network into the computer; egress is the traversal of a packet from the computer onto the network.

In some situations, the network control component 1310 provides virtual IP firewall functionality to block ingress and/or egress traffic from VNICs. Policy may either be specified in the traditional address/subnet based manner (for backwards compatibility), or, based on user/group authorizations (e.g. "user X's web servers accept traffic on port 80 from user Y's load balancers") using a permissions management system such as the one previously detailed.

In some embodiments, the administrator of each vEthernet may specify per user or group authorization, L2 filtering and rate limiting policies, which are automatically policed by the vEthernet. For example, a user may be allowed or disallowed from connecting their instances 1302 to the vEthernet, may be restricted by layer 2 filtering rules (e.g. no broadcasts) or rate limited (per VNIC initially, but ultimately on an aggregate basis, e.g. per user).

Each vEthernet may optionally be bridged onto one external VLAN accessible to the substrate network, subject to administrative authorization rules (and VLAN support in the substrate). In this case a gateway performs decapsulation and VLAN tagging on egress, and detagging and layer 2 encapsulation on ingress.

Each vEthernet may optionally be associated with a default IP gateway (via a vEthernet-local IP address). The gateway may be configured to be 'direct' (no address translation) or 'Network Address Translation (NAT)' (source NAT on egress, static destination NAT on ingress), 'direct' only being applicable where the local addressing scheme is non-overlapping with the other networks reachable via the gateway (e.g. a publicly routable address block, or customer-allocated non-publicly routable address block). IP traffic from instances, addressed to that vEthernet-local address is routed between vEthernets or onto the substrate network (see more below), subject to administrator-configured firewalling and static NAT.

Routing 1316 vEthernet IP traffic onto the substrate network is used primarily to access the customer's IP network, and via that, the internet. In the latter case, the customer's existing internet firewalling, proxying, NAT, and so on, applies.

Two implementations are possible for vEthernets, one using VLANs as the substrate network, and one using an IP network for the substrate network.

In the first implementation each vEthernet may be implemented by mapping each VNIC 1304 onto one VLAN on the substrate network 1320, subject to administrative authorization rules (and VLAN support in the substrate). Customers may use vEthernet layer 2 filtering or layer 3 firewalling described above to restrict the traffic on the VLAN. The network control component 1310 will tag intercept frames and tag them with the designated VLAN tag on egress. On ingress the VLAN tag will identify the vEthernet to which the frame must be sent, and the frame will be detagged and sent to the appropriate VNICs.

In the case of implementation using an IP network, five different types of transmissions may occur over the network:
- Unicast of Ethernet frames between instances (via interfaces) on the same vEthernet.
- Multicast and broadcast of Ethernet frames on a vEthernet.
- Instance IP network initialization (DHCP)
- Unicast of IP packets between instances (via interfaces) on the same vEthernet.
- Multicast and broadcast of IP packets between instances (via interfaces) on the same vEthernet.

Figure 13B:
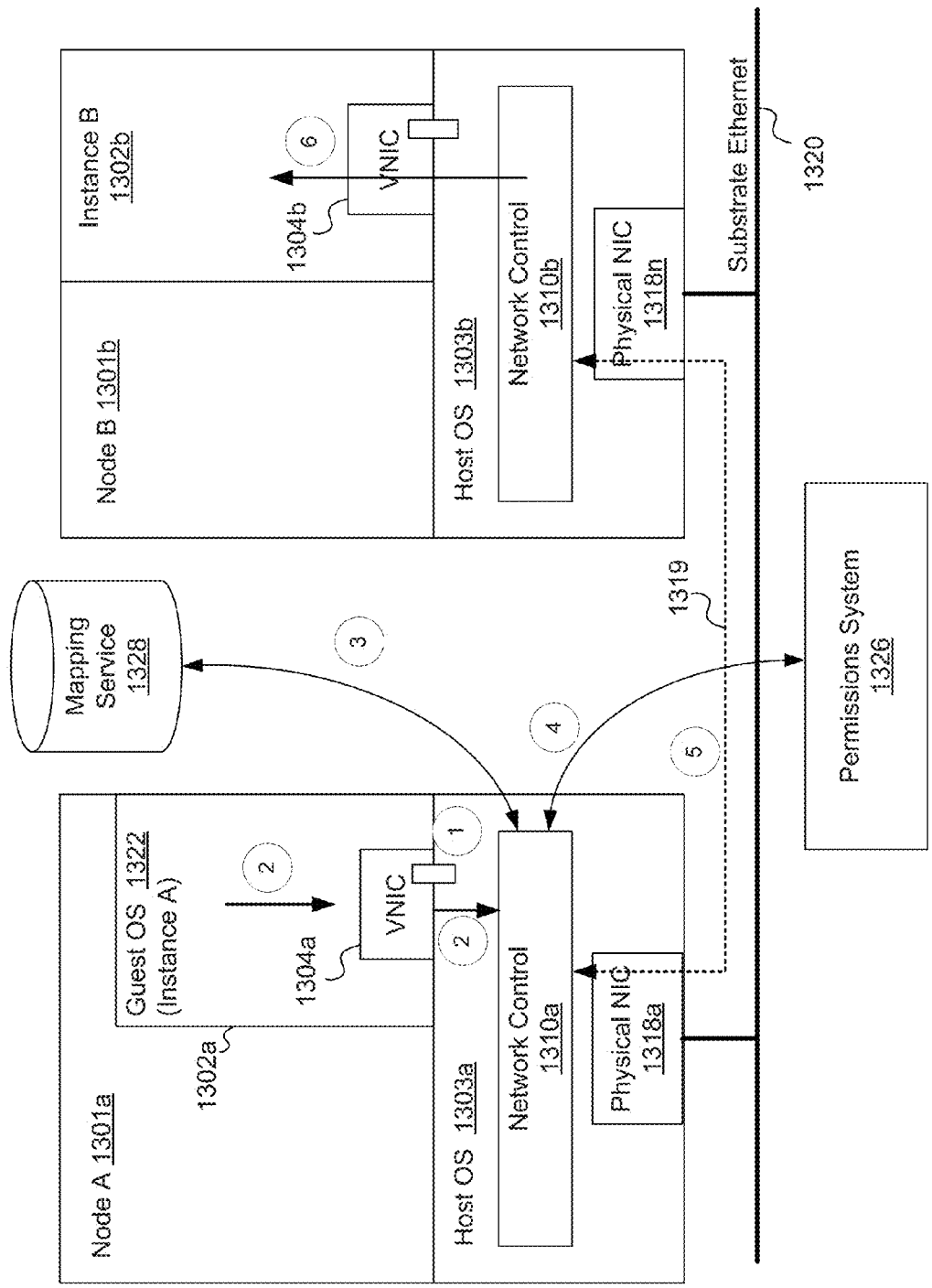

FIG. 13B illustrates the first of these, e.g., unicast of Ethernet frames, data frames, objects, or other information transmissions (collectively referred to as "packets") between instances on the same vEthernet. Each node 1301 includes a host operating system 1303, at least one instance (or VM) 1302, and network control 1310. Each instance may be associated with at least one VNIC interface 1304 and an instance operating system (also called Guest OS) 1322 for process, which may be virtually defined or physically assigned to a computing node. Contact to physical substrate is achieved via switch physical NIC 1318.

During transmission, a unique MAC address is allocated to each VNIC 1304, and exposed via the API internally in the instance, shown as step 1. The system also implements MAC spoof prevention in the network control on the host operating system 1303.

In node A 1301a, at step 2, outbound packets are intercepted in the networking control plane 1310a.

At step 3, a lookup to a mapping service 1328 determines the substrate address of the node host operating system 1303a currently hosting the destination VNIC 1304b (identified by the destination MAC address of the outbound packet). The mapping service provides a global lookup between MAC addresses of VNICs and the IP addresses of the node host operating systems 1303 that hosts them.

At step 4, the network control 1310a confirms that policy allows the communication between the source instance and destination instance may take place by consulting the permissions system 1326.

At step 5, network control 1310a installs a tunnel 1319 such as an L2TPv3 tunnel to that substrate address, which is located in node B 1301b, across which all future traffic detained to that overlay destination MAC is tunneled via encapsulation (e.g., in-kernel, such as fast path), subject to standard cache timeouts and pro-active cache invalidation by the mapping service 1328.

At step 6, inbound encapsulated packets are decapsulated in the destination control plane 1310b running in a kernel of the host operating system 1303b, and bridged to the destination node B 1301b.

In some embodiments, an optimization of the mechanism may be implemented by noting that the overlay to substrate mapping for the source vNIC can be inferred at the destination host operating system 1303b based on the source substrate IP address and source overlay MAC address, which could be used to avoid a mapping service 1328 lookup for the almost inevitable reply traffic.

The other four types of transmissions follow similar approaches.

Figure 13C:
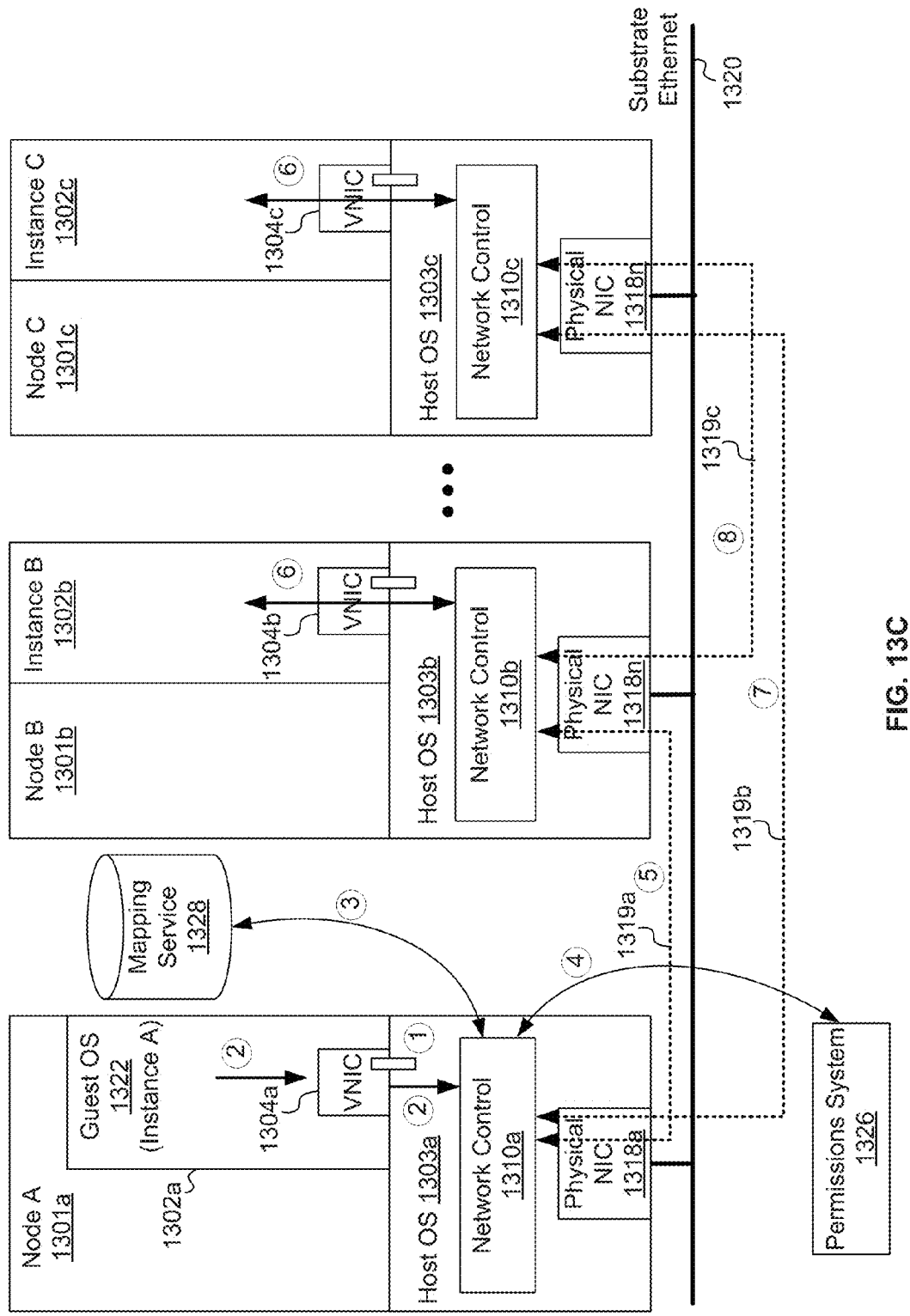

For example, FIG. 13C illustrates an implementation of many of the features of FIG. 13B but, in a multicasting and broadcasting of packets. Implementation of features which require a single packet to be sent from one to many endpoints is shown at step 5 and 7.

Multicast IP destinations and packet replication capabilities of multicast capable routers, for example at network control 1310, may be utilized to do actual packet copying and addressing. Each packet, as they are copied, is sent out to the next IP destination as shown at step 8.

Figure 13D:
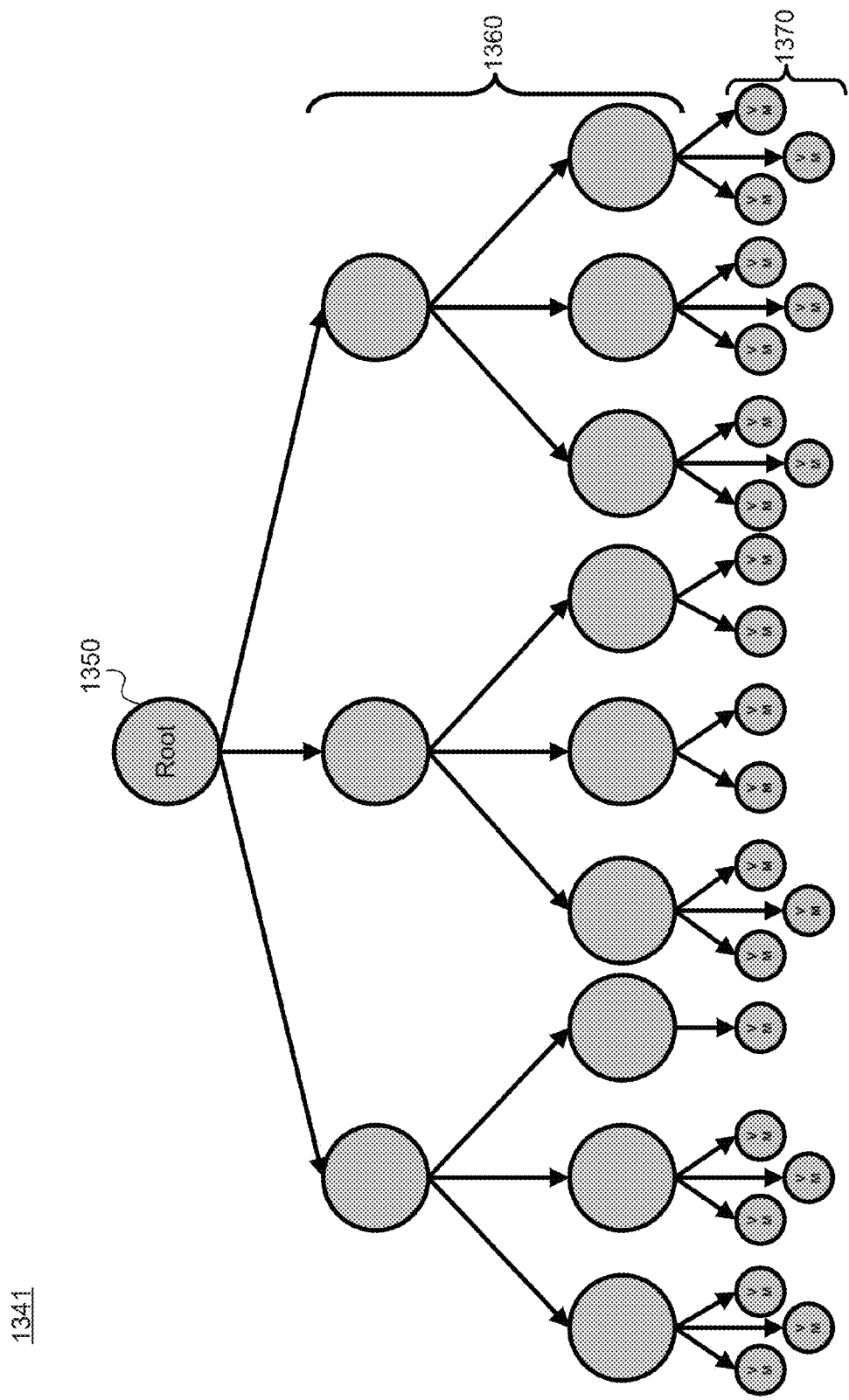
FIG. 13D is a block diagram illustrating a replication process for data transmissions on a network, according to some embodiments.

FIG. 13D is a block diagram illustrating a replication process for data transmissions on a network, according to some embodiments. One solution for resolving the data replication needs of the systems in FIGS. 13A-13C is to replicate packets at network control 1310, which includes replication and IP router capabilities. In some embodiments, given a vEthernet containing a multitude of Ethernet MAC addresses, a balanced replication tree 1341 is formed from an interior node 1350 that is the root of the replication tree 1341. The replication tree 1341 is designed with a constant fanout or replication factor at every interior node 1360, such that each interior node 1360 in the replication tree represents a networking element on a physical node. The leaves of the tree 1370 represent the Ethernet MAC addresses of all VNICs in that vEthernet. This provides a constant latency, time, and jitter solution for broadcast or multicast packets sent on the vEthernet by subdividing the task. Thus, at any time all leaf nodes 1370 are about log N deep from the root of the tree, and each node 1360 has a small amount of replicas to perform, and thus this is an extremely scalable way of broadcasting or multicasting to thousands of VMs in a vEthernet.

The replication tree 1341 is balanced and self-balancing, thus always having the desirable property above, regardless of the order in which MAC addresses join and/or leave the vEthernet.

To prevent multiple replicas for the same packet being sent across expensive and slow Wide Area Network (WAN) links, a special algorithm is used to construct the tree 1341, where, in addition to its self balancing nature, the tree 1341 also maintains all nodes 1360 behind the same WAN endpoint to be placed in the same subtree of the main tree. The interior node 1350 that is at the top of the subtree is the only node which receives a replica over the WAN link, and all further replicas destined for VMs within that same data center may be created within that data center itself.

It will be appreciated that there is no distinction between treatment of broadcasts versus multicast Ethernet packets, and the same broadcast tree is used for both purposes.

Federation

Figure 14:
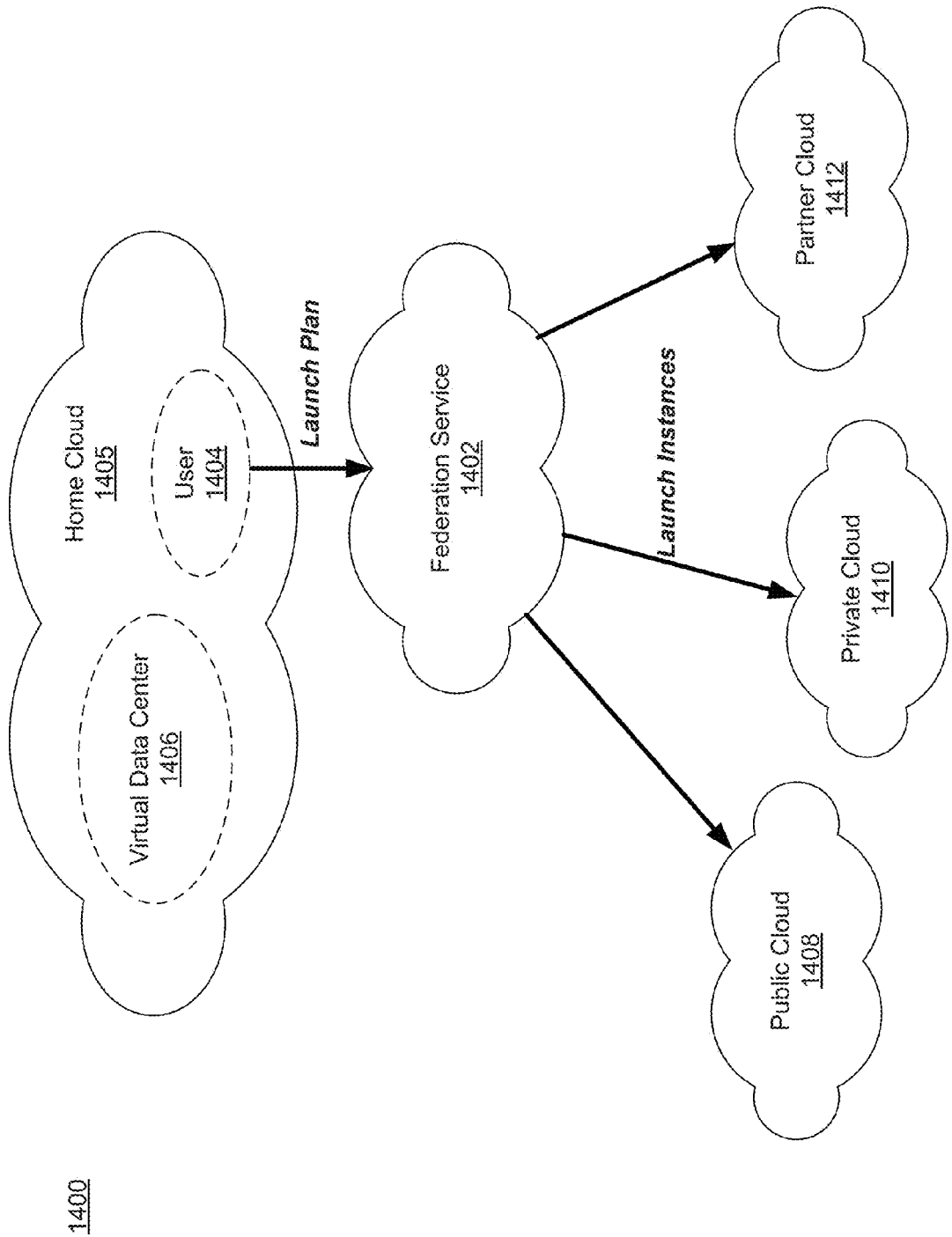
FIG. 14 is a schematic diagram illustrating federation, according to some embodiments.

FIG. 14 illustrates a federation system 1400 of the cloud computing environment, according to some embodiments. Federation service 1402 provides the ability to communicate with other cloud sites 1408-1412 (collectively, "remote sites") through a customer's "home site." It allows, in addition to running instances in a virtual data center 1406 of a home cloud (or local site) 1405, for the launching of instances in remote sites that are either other instances of the cloud system, such as a partner cloud 1412, or public and private clouds 1408, 1410 running other software.

The federation service 1402 consists of a number of participating clouds 1410 and 1412, and clouds accessible via proxy services, for example a public cloud 1408. Clouds can be distinguish between clouds that have registered to be part of the federation of clouds (e.g., clouds 1410 and 1412) and those that are accessed by proxy, such as public clouds 1408. The proxy service may be a service provided at the home cloud (1405) of the user or it may be provided remotely, but within the federation service 1402. In some embodiments, all the clouds registered with the federation service 1402 may be accessed by the proxy service.

Requests for cloud services can be distributed across multiple "cloud providers" by the federation service 1402 while satisfying specified criteria regarding the requests. For example, a user 1404 of "home cloud" 1405, being an implementation of 100, may request a number of virtual machine instances to be launched in both the system 100, as well as a public cloud. The federation service of system 100 will proxy the request for resources in the public cloud 1408 to that system.

Once the user 1404 has issued the launch plan to the "home cloud"1405, a proxy service in the federation service 1402 forwards the resource requests that are part of the launch plan but are destined for clouds other than the "home cloud" (1405), from the "home cloud" (1405), to a remote public or private cloud 1408-1412. The proxy service translates requests from the format used by the API to requests that are suitable for the remote system.

CONCLUSION

The foregoing description, for purpose of explanation, has been described with reference to specific examples. However, the illustrative discussions above are not intended to be exhaustive or to limit the invention to the precise forms disclosed. Many modifications and variations are possible in view of the above teachings. This includes practicing the examples of the various subject matter described above in any combination. The examples were chosen and described in order to best explain the principles of the invention and its practical applications, to thereby enable others skilled in the art to best utilize the inventions with various modifications as are suited to the particular use contemplated.

What is claimed:

1. A method of launching an instance in a multi-cloud computing environment having a plurality of computing nodes, the method comprising:
   receiving, at a user's home cloud system, a request from the user to launch an instance of an object;
   determining, at the home cloud system, a designated remote cloud system from a federated plurality of remote cloud systems based on the request;
   translating the request into a format suitable for the designated remote cloud system;
   communicating the translated request to the designated remote cloud system;
   launching the instance of the object at the designated remote cloud system by executing instructions from a launch plan that specifies an ideal state for the designated remote cloud system;
   monitoring a current state of the designated remote cloud system to determine that one or more nodes in the designated remote cloud system have crashed;
   determining, from the monitoring, that the current state differs from the ideal state due at least in part to the crash of the one or more nodes and due to a first quantity of instances of an image specified within the ideal state being greater than a second quantity of instances of the image currently being executed in the designated remote cloud system;
   in response to determining that the current state differs from the ideal state due at least in part to the crash of the one or more nodes, performing instructions specified in the launch plan to cause the current state to match the ideal state, including executing a third quantity of new instances of the image within the designated remote cloud system, wherein the sum of the third quantity and the second quantity is at least as great as the first quantity.

2. The method of claim 1, wherein the federated plurality of remote cloud systems includes at least one public cloud system.

3. The method of claim 2, wherein the designated remote cloud system is a public cloud system.

4. The method of claim 1, wherein the launch plan includes instructions to launch a virtual machine instance.

5. The method of claim 1, wherein the launch plan includes instructions to launch an object by a computing node.

6. The method of claim 5, wherein the object is a machine image from which data is accessed.

7. The method of claim 5, wherein the object is executed code.

8. The method of claim 5, wherein the object is a data store.

9. A multi-cloud computing system, comprising:
   a plurality of computing nodes; and
   the system configured to:
   receive, at a user's home cloud system, a request from the user to launch an instance of an object;
   determine, at the home cloud system, a designated remote cloud system from a federated plurality of remote cloud systems based on the request;
   translate the request into a format suitable for the designated remote cloud system;
   communicate the translated requested to the designated remote cloud system;
   launch the instance of the object at the designated remote cloud system by executing instructions from a launch plan that specifies an ideal state for the designated remote cloud system;
   monitor a current state of the designated remote cloud system to determine that one or more nodes in the designated remote cloud system have crashed;
   determine, from the monitoring, that the current state differs from the ideal state due at least in part to the crash of the one or more nodes and due to a first quantity of instances of an image specified within the ideal state being greater than a second quantity of instances of the image currently being executed in the designated remote cloud system; and
   in response to determining that the current state differs from the ideal state due at least in part to the crash of the one or more nodes, perform instructions specified in the launch plan to cause the current state to match the ideal state, including executing a third quantity of new instances of the image within the designated remote cloud system, wherein the sum of the third quantity and the second quantity is at least as great as the first quantity.

10. The system of claim 9 further comprising a virtualization layer configured to create a virtual computing environment on each of the plurality of computing nodes.

11. A non-transitory computer-readable storage medium storing instructions which, when performed by one or more processors, cause the one or more processors to perform operations comprising:
   receiving, at a user's home cloud system, a request from the user to launch an instance of an object;
   determining, at the home cloud system, a designated remote cloud system from a federated plurality of remote cloud systems based on the request;
   translating the request into a format suitable for the designated remote cloud system;
   communicating the translated request to the designated remote cloud system;

launching the instance of the object at the designated remote cloud system by executing instructions from a launch plan that specifies an ideal state for the designated remote cloud system;

monitoring a current state of the designated remote cloud system to determine that one or more nodes in the designated remote cloud system have crashed;

determining, from the monitoring, that the current state differs from the ideal state due at least in part to the crash of the one or more nodes and due to a first quantity of instances of an image specified within the ideal state being greater than a second quantity of instances of the image currently being executed in the designated remote cloud system; and in response to determining that the current state differs from the ideal state due at least in part to the crash of the one or more nodes, performing instructions specified in the launch plan to cause the current state to match the ideal state, including executing a third quantity of new instances of the image within the designated remote cloud system, wherein the sum of the third quantity and the second quantity is at least as great as the first quantity.

12. The method of claim 1, further comprising:

receiving, from the user, a request to perform an action relative to the instance of the object in the designated remote cloud;

determining, based on user permissions stored within the user's home cloud system, whether the user is authorized to perform the action;

in response to determining that the user is authorized to perform the action, generating a token within the user's home cloud system and forwarding the token to the designated remote cloud for validation of the token and determination of whether performance of the action relative to the instance of the object is permitted.

13. The system of claim 9, wherein the system is configured to:

receive, from the user, a request to perform an action relative to the instance of the object in the designated remote cloud;

determine, based on user permissions stored within the user's home cloud system, whether the user is authorized to perform the action;

in response to determining that the user is authorized to perform the action, generate a token within the user's home cloud system and forward the token to the designated remote cloud for validation of the token and determination of whether performance of the action relative to the instance of the object is permitted.

14. The non-transitory computer-readable storage medium of claim 11, wherein the instructions, when performed by the one or more processors, cause the one or more processors to perform operations comprising:

receiving, from the user, a request to perform an action relative to the instance of the object in the designated remote cloud;

determining, based on user permissions stored within the user's home cloud system, whether the user is authorized to perform the action;

in response to determining that the user is authorized to perform the action, generating a token within the user's home cloud system and forwarding the token to the designated remote cloud for validation of the token and determination of whether performance of the action relative to the instance of the object is permitted.

* * * * *

UNITED STATES PATENT AND TRADEMARK OFFICE
CERTIFICATE OF CORRECTION

| | | |
|---|---|---|
| PATENT NO. | : 8,977,679 B2 | Page 1 of 1 |
| APPLICATION NO. | : 13/299287 | |
| DATED | : March 10, 2015 | |
| INVENTOR(S) | : Willem Robert Van Biljon et al. | |

It is certified that error appears in the above-identified patent and that said Letters Patent is hereby corrected as shown below:

On The Title Page

Column 1, Item (75) Inventors (Inventor No. 5)
Replace "Capetown" with --Cape Town--

In The Specification

Column 24, Line 50
Replace "compute" with --computer--

Column 31, Line 5
Replace "group: acme" with --group:/acme--

In The Claims

Column 47, Claim 1, Line 58
Replace "system" with --system; and--

Signed and Sealed this
Third Day of May, 2016

Michelle K. Lee
*Director of the United States Patent and Trademark Office*